United States Patent
Zhang et al.

(10) Patent No.: US 11,457,222 B2
(45) Date of Patent: Sep. 27, 2022

(54) METHOD AND APPARATUS FOR INTRA PREDICTION OF PICTURE BLOCK

(71) Applicant: HUAWEI TECHNOLOGIES CO., LTD., Shenzhen (CN)

(72) Inventors: Na Zhang, Shenzhen (CN); Jicheng An, Shenzhen (CN); Jianhua Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/035,711

(22) Filed: Sep. 29, 2020

(65) Prior Publication Data
US 2021/0014506 A1  Jan. 14, 2021

Related U.S. Application Data

(63) Continuation of application No. PCT/CN2018/081494, filed on Mar. 31, 2018.

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/176* (2014.11); *H04N 19/186* (2014.11); *H04N 19/70* (2014.11)

(58) Field of Classification Search
USPC .................................................. 375/240, 20
See application file for complete search history.

(56) References Cited

U.S. PATENT DOCUMENTS

2014/0226912 A1  8/2014  Lee et al.
2018/0184082 A1  6/2018  Yoo et al.
(Continued)

FOREIGN PATENT DOCUMENTS

CN  102804775 A  11/2012
CN  103096066 A  5/2013
(Continued)

OTHER PUBLICATIONS

Anand Meher Kotra et al., CE3 3.2.2: Intra mode signaling with priority based MPM and non-MPM list construction. Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0365, 5 pages.
(Continued)

*Primary Examiner* — Patricia I Young
(74) *Attorney, Agent, or Firm* — Rimon PC

(57) ABSTRACT

A method and an apparatus and for intra prediction of a picture block are provided, to provide a manner of predicting a current block by using spatial non-adjacent blocks or a temporal neighboring block, thereby improving coding performance. In various embodiments, a first luma intra mode set is constructed; and a bitstream is parsed to obtain a first identifier. In those embodiments, when the first identifier indicates that a luma prediction mode of the current block belongs to the first luma intra mode set, the bitstream is parsed to obtain a second identifier. The second identifier indicates that a candidate luma prediction mode in the first luma intra mode set is used as the luma prediction mode of the current block. Still in those embodiments, a luma prediction value of the current block is obtained based on the luma prediction mode of the current block.

20 Claims, 10 Drawing Sheets

(51) Int. Cl.
*H04N 19/176* (2014.01)
*H04N 19/186* (2014.01)
*H04N 19/70* (2014.01)

(56) References Cited

U.S. PATENT DOCUMENTS

| | | | |
|---|---|---|---|
| 2018/0205946 A1* | 7/2018 | Zhang | H04N 19/136 |
| 2019/0222837 A1* | 7/2019 | Lee | H04N 19/44 |
| 2020/0036985 A1* | 1/2020 | Jang | H04N 19/105 |

FOREIGN PATENT DOCUMENTS

| | | |
|---|---|---|
| CN | 107483932 A | 12/2017 |
| CN | 107852497 A | 3/2018 |
| EP | 3306935 A1 | 4/2018 |
| WO | 2016195453 A1 | 12/2016 |
| WO | 2016204478 A1 | 12/2016 |
| WO | 2017008679 A1 | 1/2017 |

OTHER PUBLICATIONS

V. Seregin et al., Neighbor based intra most probable modes list derivation, Joint Video Exploration Team (JVET) of ITU-T SG 16 WP 3 and ISO/IEC JTC 1/SC 29/WG 11, JVET-C0055, 3rd Meeting: Geneva, CH, 26 May-Jun. 1, 2016. total 4 pages.

S. Kim et al., Further improvement of intra coding tools, Joint Video Exploration Team (JVET) of ITU-T SG 16 WP 3 and ISO/IEC JTC 1/SC 29/WG 11, JVET-B0051, 2nd Meeting: San Diego, USA, Feb. 20-26, 2016, total 4 pages.

Y. Han et al., Improvements for Intra Prediction Mode Coding, Joint Video Exploration Team (JVET) of ITU-T SG 16 WP 3 and SO/IEC JTC 1/SC 29/WG 11, JVET-G0060, 7th Meeting: Torino, IT, Jul. 13-21, 2017. total 4 pages.

J. Chen et al., Algorithm Description of Joint Exploration Test Model 7, Joint Video Exploration Team (JVET) of ITU-T SG 16 WP 3 and ISO/IEC JTC 1/SC 29/WG 11, JVET-G1001, 7th Meeting: Torino, IT, Jul. 13-21, 2017. total 51 pages.

* cited by examiner

Sub-block in the center

METHOD AND APPARATUS FOR INTRA PREDICTION OF PICTURE BLOCK

CROSS-REFERENCE TO RELATED APPLICATIONS

This application is a continuation of International Application No. PCT/CN2018/081494, filed on Mar. 31, 2018, the disclosure of which is hereby incorporated by reference in its entirety.

TECHNICAL FIELD

This application relates to the field of picture processing technologies, and in particular, to a method and an apparatus for intra prediction of a picture block.

BACKGROUND

A basic principle of video coding compression is to eliminate redundancy as much as possible based on a correlation between a space domain, a time domain, and a codeword. Currently, a prevalent method is to use a picture-block-based hybrid video coding framework to implement video coding compression by performing steps such as prediction (including intra prediction and inter prediction), transform, quantization, and entropy coding.

Currently, in intra prediction, a reconstructed neighbouring block of a current block is usually used to predict the current block. Currently, there is no other method except using a neighbouring block.

SUMMARY

Various embodiments provide a method and an apparatus for intra prediction of a picture block, to provide a manner of predicting a current block by using spatial non-adjacent blocks or a temporal neighboring block, thereby improving coding performance.

According to a first aspect, a method for intra prediction of a picture block is provided, including: constructing a first luma intra mode set for a current block, where the first luma intra mode set is a subset of a plurality of preset candidate luma prediction modes; and the first luma intra mode set includes a determined luma prediction mode of a picture block that is not spatially adjacent to the current block in a picture in which the current block is located and/or a determined luma prediction mode of a picture block that temporally neighbors to the current block in the picture in which the current block is located; parsing a received bitstream to obtain a first identifier; when the first identifier indicates that a luma prediction mode of the current block belongs to the first luma intra mode set, parsing the bitstream to obtain a second identifier, where the second identifier is used to indicate that a candidate luma prediction mode in the first luma intra mode set is used as the luma prediction mode of the current block; and obtaining a luma prediction value of the current block based on the luma prediction mode of the current block.

When the first luma intra mode set is constructed by using the foregoing solution, a luma prediction mode of a picture block whose intra prediction mode has been determined and that is not spatially adjacent to the current block in the picture in which the current block is located and/or a luma prediction mode of the picture block whose intra prediction mode has been determined and that temporally neighbors to the current block in the picture in which the current block is located are considered. In this way, more spatial or temporal prior coding information is used, so that coding performance is improved.

In one example design, when the first identifier indicates that the luma prediction mode of the current block does not belong to the first luma intra mode set, the method further includes: constructing a second luma intra mode set, where the second luma intra mode set is a subset of the plurality of preset candidate luma prediction modes, there is no intersection between the second luma intra mode set and the first luma intra mode set, the candidate luma prediction modes in the second luma intra mode set include a determined luma prediction mode of a picture block that is not spatially adjacent to the current block in the picture in which the current block is located and/or a determined luma prediction mode of a picture block that temporally neighbors to the current block in the picture in which the current block is located; parsing the bitstream to obtain a third identifier; when the third identifier indicates that the luma prediction mode of the current block belongs to the second luma intra mode set, parsing the bitstream to obtain a fourth identifier, where the fourth identifier is used to indicate that a candidate luma prediction mode in the second luma intra mode set is used as the luma prediction mode of the current block; and obtaining a luma prediction value of the current block based on the luma prediction mode of the current block.

In the foregoing design, when the second intra mode set is constructed, the determined luma prediction mode of the picture block that is not spatially adjacent to the current block in the picture in which the current block is located and/or the determined luma prediction mode of the picture block that temporally neighbors to the current block in the picture in which the current block is located are considered. In this way, more spatial or temporal prior coding information is used, so that coding performance is improved.

In one example design, after the luma prediction value of the current block is obtained, the method further includes: parsing the bitstream to obtain a fifth identifier; when the fifth identifier indicates that a chroma prediction mode of the current block is not a cross-component linear model (CCLM) mode, constructing a chroma intra mode set, where the chroma intra mode set includes a determined chroma prediction mode of a picture block that is not spatially adjacent to the current block in the picture in which the current block is located and/or a determined chroma prediction mode of a picture block that temporally neighbors to the current block in the picture in which the current block is located; parsing the bitstream to obtain a sixth identifier, where the sixth identifier is used to indicate that a candidate chroma prediction mode in the chroma intra mode set is used as the chroma prediction mode of the current block; and obtaining a chroma prediction value of the current block based on the chroma prediction mode of the current block.

In the foregoing design, when the chroma intra mode set is constructed, the determined chroma prediction mode of the picture block that is not spatially adjacent to the current block in the picture in which the current block is located and/or the determined chroma prediction mode of the picture block that temporally neighbors to the current block in the picture in which the current block is located are considered. In this way, more spatial or temporal prior coding information is used, so that coding performance is improved.

In one example design, the picture in which the current block is located includes at least two rows of coding tree units CTUs, and a size of the current block is not greater than a size of a coding tree unit in which the current block is located; and a difference between a number of a row, in the picture, of the coding tree unit in which the current block is located and a number of a row, in the picture, of a coding tree unit in which the picture block not spatially adjacent to the current block is located is less than N, where N is an integer greater than 1.

In one example design, N is 2.

In the foregoing design, a position of the basic pixel unit is limited within a specific range, so that specific coding performance can be maintained.

In one example design, the current block has a width of w and a height of h, the picture in which the current block is located includes M groups of picture blocks not spatially adjacent to the current block, and each group of picture blocks not spatially adjacent to the current block has a group number, where a picture block with a group number i includes picture blocks in which pixel set basic units in the following coordinate positions in a virtual coordinate system are located: $(-i \times w, -i \times h)$, $(1+m \times w, -i \times h)$, $(-m \times w, -i \times h)$, $(-i \times w, -m \times h)$, and $(-i \times w, m \times h+1)$, where m is an integer in a range from 0 to $i-1$; M, i, w, and h are positive integers; i is not greater than M, and a value of i is not 1; and in the virtual coordinate system, a position, in the picture, of a pixel set basic unit at the bottom-right corner of the current block is used as an origin, a straight line on which the bottom boundary of the current block is located is used as a horizontal coordinate axis with a rightward direction as a positive horizontal direction, and a straight line on which the right boundary of the current block is located is used as a vertical coordinate axis with a downward direction as a positive vertical direction.

In one example design, the constructing the first luma intra mode set includes:

constructing the first luma intra mode set based on a determined luma prediction mode and a non-directional prediction mode of a picture block adjacent to the current block, where a quantity of candidate luma prediction modes included in the first luma intra mode set does not reach a preset value; and sequentially adding, to the first luma intra mode set, a luma prediction mode of a sub-block in the center of a co-located block and a luma prediction mode of a spatial neighboring block at the bottom-right corner of the co-located block, until the quantity of candidate luma prediction modes included in the first luma intra mode set reaches the preset value, where the sub-block is a basic unit for storing prediction information; the co-located block is a picture block, whose size, shape, and position are all the same as those of the current block, in a reference picture temporally neighboring to the picture in which the current block is located; and the candidate luma prediction modes included in the first luma intra mode set are different from each other.

In one example design, after the luma prediction mode of the sub-block in the center of the co-located block and the luma prediction mode of the spatial neighboring block at the bottom-right corner of the co-located block are sequentially added to the first luma intra mode set, the quantity of candidate luma prediction modes included in the first luma intra mode set does not reach the preset value, the method further includes:

sequentially adding, in ascending order of the group numbers, determined luma prediction modes of picture blocks not spatially adjacent to the current block to the first luma intra mode set, until the quantity of candidate luma prediction modes in the first luma intra mode set reaches the preset value, where the candidate luma prediction modes in the first luma intra mode set are different from each other.

In one example design, after the luma prediction mode of the sub-block in the center of the co-located block and the luma prediction mode of the spatial neighboring block at the bottom-right corner of the co-located block are sequentially added to the first luma intra mode set, the quantity of candidate luma prediction modes included in the first luma intra mode set does not reach the preset value, the method further includes:

sequentially adding, in ascending order of distances to the origin from picture blocks not spatially adjacent to the current block, the determined luma prediction modes of the picture blocks not spatially adjacent to the current block to the first luma intra mode set, where the distance is a sum of absolute values of a horizontal coordinate and a vertical coordinate, in the virtual coordinate system, of a pixel set basic unit in a preset position in the picture blocks not spatially adjacent to the current block.

In one example design, the sequentially adding the determined luma prediction modes of the picture blocks not spatially adjacent to the current block to the first luma intra mode set includes:

sequentially adding, to the first luma intra mode set in order of picture blocks in which pixel set basic units in the following coordinate positions in the virtual coordinate system are located, the determined luma prediction modes of the picture blocks not spatially adjacent to the current block, until the quantity of candidate luma prediction modes in the first luma intra mode set reaches the preset value: $(-2 \times w, 0)$, $(0, -2 \times h)$, $(1, -2 \times h)$, $(-2 \times w, 1)$, $(-w, -2 \times h)$, $(-2 \times w, -h)$, $(-2 \times w, h+1)$, $(w+1, -2 \times h)$, $(-2 \times w, -2 \times h)$, $(-3 \times w, 0)$, $(0, -3 \times h)$, $(1, -3 \times h)$, $(-3 \times w, 1)$, $(-w, -3 \times h)$, $(-3 \times w, -h)$, $(w+1, -3 \times h)$, $(-3 \times w, h+1)$, $(-2 \times w, -3 \times h)$, $(-3 \times w, -2 \times h)$, $(2 \times w+1, -3 \times h)$, $(-3 \times w, 2 \times h+1)$, and $(-3 \times w, -3 \times h)$.

A beneficial effect of this design is as follows: When each luma prediction mode is represented in a unary-code-based coding mode, a luma prediction mode that ranks higher is encoded by using a shorter codeword, and a luma prediction mode that ranks lower is encoded by using a longer codeword. Properly determining, based on a correlation between a determined intra prediction mode of a picture block and a prediction mode of a to-be-processed picture block, the order of obtaining the candidate luma prediction modes helps select a better codeword coding policy, thereby improving coding performance.

In one example design, the constructing the first luma intra mode set includes:

constructing the first luma intra mode set based on a determined luma prediction mode and a non-directional prediction mode of a picture block spatially adjacent to the current block, where a quantity of candidate luma prediction modes included in the first luma intra mode set does not reach a preset value; and sequentially adding, in ascending order of the group numbers, determined luma prediction modes of picture blocks not spatially adjacent to the current block to the first luma intra mode set, until the quantity of candidate luma prediction modes in the first luma intra mode set reaches the preset value, where the candidate luma prediction modes in the first luma intra mode set are different from each other.

In one example design, after the determined luma prediction modes of the picture blocks not spatially adjacent to the current block are sequentially added to the first luma intra mode set, the quantity of candidate luma prediction modes included in the first luma intra mode set does not reach the preset value, the method further includes:

sequentially adding, to the first luma intra mode set, a luma prediction mode of a sub-block in the center of a co-located block and a luma prediction mode of a spatial neighboring block at the bottom-right corner of the co-located block, until the quantity of candidate luma prediction modes included in the first luma intra mode set reaches the preset value.

According to a second aspect, this application provides a method for intra prediction of a picture block, including:

constructing a first luma intra mode set for a current block, where the first luma intra mode set is a subset of a plurality of preset candidate luma prediction modes; parsing a received bitstream to obtain a first identifier; when the first identifier indicates that a luma prediction mode of the current block does not belong to the first luma intra mode set, constructing a second luma intra mode set, where the second luma intra mode set is a subset of the plurality of preset candidate luma prediction modes, there is no intersection between the second luma intra mode set and the first luma intra mode set, and the second luma intra mode set includes a determined luma prediction mode of a picture block that is not spatially adjacent to the current block and/or a determined luma prediction mode of a picture block that temporally neighbors to the current block; parsing the bitstream to obtain a second identifier; when the second identifier indicates that the luma prediction mode of the current block belongs to the second luma intra mode set, parsing the bitstream to obtain a third identifier, where the third identifier is used to indicate that a candidate luma prediction mode in the second luma intra mode set is used as the luma prediction mode of the current block; and obtaining a luma prediction value of the current block based on the luma prediction mode of the current block.

In the foregoing design, when the second intra mode set is constructed, the determined luma prediction mode of the picture block that is not spatially adjacent to the current block in the picture in which the current block is located and/or the determined luma prediction mode of the picture block that temporally neighbors to the current block in the picture in which the current block is located are considered. In this way, more spatial or temporal prior coding information is used, so that coding performance is improved.

A manner for constructing the first luma intra mode set may be a solution provided in the prior art, or may be the solution provided in any one of the first aspect or the designs of the first aspect.

In one example design, after the luma prediction value of the current block is obtained, the method further includes: parsing the bitstream to obtain a fourth identifier; when the fourth identifier indicates that a chroma prediction mode of the current block is not a cross-component linear model (CCLM) mode, constructing a chroma intra mode set, where the chroma intra mode set includes determined a chroma prediction mode of a picture block that is not spatially adjacent to the current block in the picture in which the current block is located and/or a determined chroma prediction mode of a picture block that temporally neighbors to the current block in the picture in which the current block is located; parsing the bitstream to obtain a fifth identifier, where the fifth identifier is used to indicate that a candidate chroma prediction mode in the chroma intra mode set is used as the chroma prediction mode of the current block; and obtaining a chroma prediction value of the current block based on the chroma prediction mode of the current block.

In the foregoing design, when the chroma intra mode set is constructed, the determined chroma prediction mode of the picture block that is not spatially adjacent to the current block in the picture in which the current block is located and/or the determined chroma prediction mode of the picture block that temporally neighbors to the current block in the picture in which the current block is located are considered. In this way, more spatial or temporal prior coding information is used, so that coding performance is improved.

In one example design, the picture in which the current block is located includes at least two rows of coding tree units (CTUs), and a size of the current block is not greater than a size of a coding tree unit in which the current block is located; and a difference between a number of a row, in the picture, of the coding tree unit in which the current block is located and a number of a row, in the picture, of a coding tree unit in which the picture block not spatially adjacent to the current block is located is less than N, where N is an integer greater than 1.

In one example design, the current block has a width of w and a height of h, the picture in which the current block is located includes M groups of picture blocks not spatially adjacent to the current block, and each group of picture blocks not spatially adjacent to the current block has a group number, where a picture block with a group number i includes picture blocks in which pixel set basic units in the following coordinate positions in a virtual coordinate system are located: $(-i\times w, -i\times h)$, $(1+m\times w, -i\times h)$, $(-m\times w, -i\times h)$, $(-i\times w, -m\times h)$, and $(-i\times w, m\times h+1)$, where m is an integer in a range from 0 to $i-1$; M, i, w, and h are positive integers; i is not greater than M, and a value of i is not 1; and in the virtual coordinate system, a position, in the picture, of a pixel set basic unit at the bottom-right corner of the current block is used as an origin, a straight line on which the bottom boundary of the current block is located is used as a horizontal coordinate axis with a rightward direction as a positive horizontal direction, and a straight line on which the right boundary of the current block is located is used as a vertical coordinate axis with a downward direction as a positive vertical direction.

In one example design, the constructing the second luma intra mode set includes:

sequentially adding, to the second luma intra mode set, a luma prediction mode of a sub-block in the center of a co-located block and a luma prediction mode of a spatial neighboring block at the bottom-right corner of the co-located block, until a quantity of candidate luma prediction modes included in the second luma intra mode set reaches a preset value, where the sub-block is a basic unit for storing prediction information; the co-located block is a picture block, whose size, shape, and position are all the same as those of the current block, in a reference picture temporally neighboring to the picture in which the current block is located; and the candidate luma prediction modes included in the second luma intra mode set are different from each other.

In one example design, after the luma prediction mode of the sub-block in the center of the co-located block and the luma prediction mode of the spatial neighboring block at the bottom-right corner of the co-located block are sequentially added to the second luma intra mode set, the quantity of candidate luma prediction modes included in the second luma intra mode set does not reach the preset value, the method further includes:

sequentially adding, in ascending order of the group numbers, determined luma prediction modes of picture blocks not spatially adjacent to the current block to the second luma intra mode set, until the quantity of candidate luma prediction modes in the second luma intra mode set reaches the preset value, where the candidate luma prediction modes in the second luma intra mode set are different from each other.

In one example design, after the luma prediction mode of the sub-block in the center of the co-located block and the luma prediction mode of the spatial neighboring block at the bottom-right corner of the co-located block are sequentially added to the second luma intra mode set, the quantity of candidate luma prediction modes included in the second luma intra mode set does not reach the preset value, the method further includes:

sequentially adding, in ascending order of distances to the origin from picture blocks not spatially adjacent to the current block, determined luma prediction modes of the picture blocks not spatially adjacent to the current block to the second luma intra mode set, where the distance is a sum of absolute values of a horizontal coordinate and a vertical coordinate, in the virtual coordinate system, of a pixel set basic unit in a preset position in the picture block not spatially adjacent to the current block.

In one example design, the sequentially adding the determined luma prediction modes of the picture blocks not spatially adjacent to the current block to the second luma intra mode set includes:

sequentially adding, to the second luma intra mode set in order of picture blocks in which pixel set basic units in the following coordinate positions in the virtual coordinate system are located, the determined luma prediction modes of the picture blocks not spatially adjacent to the current block, until the quantity of candidate luma prediction modes in the second luma intra mode set reaches the preset value: $(-2 \times w, 0)$, $(0, -2 \times h)$, $(1, -2 \times h)$, $(-2 \times w, 1)$, $(-w, -2 \times h)$, $(-2 \times w, -h)$, $(-2 \times w, h+1)$, $(w+1, -2 \times h)$, $(-2 \times w, -2 \times h)$, $(-3 \times w, 0)$, $(0, -3 \times h)$, $(1, -3 \times h)$, $(-3 \times w, 1)$, $(-w, -3 \times h)$, $(-3 \times w, -h)$, $(w+1, -3 \times h)$, $(-3 \times w, h+1)$, $(-2 \times w, -3 \times h)$, $(-3 \times w, -2 \times h)$, $(2 \times w+1, -3 \times h)$, $(-3 \times w, 2 \times h+1)$, and $(-3 \times w, -3 \times h)$.

In one example design, the constructing the second luma intra mode set includes:

sequentially adding, in ascending order of the group numbers, determined luma prediction modes of picture blocks not spatially adjacent to the current block to the second luma intra mode set, until the quantity of candidate luma prediction modes in the second luma intra mode set reaches the preset value, where the candidate luma prediction modes in the second luma intra mode set are different from each other.

In one example design, after the determined luma prediction modes of the picture blocks not spatially adjacent to the current block are sequentially added to the second luma intra mode set, the quantity of candidate luma prediction modes included in the second luma intra mode set does not reach the preset value, the method further includes:

sequentially adding, to the second luma intra mode set, a luma prediction mode of a sub-block in the center of co-located block and a luma prediction mode of a spatial neighboring block at the bottom-right corner of the co-located block, until the quantity of candidate luma prediction modes included in the second luma intra mode set reaches the preset value.

According to a third aspect, this application provides a method for intra prediction of a picture block, including: parsing a received bitstream to obtain a first identifier; when the first identifier indicates that a chroma prediction mode of a current block is not a cross-component linear model CCLM mode, constructing a chroma intra mode set for the current block, where the chroma intra mode set includes a determined chroma prediction mode of a picture block that is not spatially adjacent to the current block in a picture in which the current block is located and/or a determined chroma prediction mode of a picture block that temporally neighbors to the current block in the picture in which the current block is located; parsing the bitstream to obtain a second identifier, where the second identifier is used to indicate that a candidate chroma prediction mode in the chroma intra mode set is used as the chroma prediction mode of the current block; and obtaining a chroma prediction value of the current block based on the chroma prediction mode of the current block.

In one example design, the picture in which the current block is located includes at least two rows of coding tree units (CTUs), and a size of the current block is not greater than a size of a coding tree unit in which the current block is located; and a difference between a number of a row, in the picture, of the coding tree unit in which the current block is located and a number of a row, in the picture, of a coding tree unit in which the picture block not spatially adjacent to the current block is located is less than N, where N is an integer greater than 1.

In one example design, the current block has a width of w and a height of h, the picture in which the current block is located includes M groups of picture blocks not spatially adjacent to the current block, and each group of picture blocks not spatially adjacent to the current block has a group number, where a picture block with a group number i includes picture blocks in which pixel set basic units in the following coordinate positions in a virtual coordinate system are located: $(-i \times w, -i \times h)$, $(1+m \times w, -i \times h)$, $(-m \times w, -i \times h)$, $(-i \times w, -m \times h)$, and $(-i \times w, m \times h+1)$, where m is an integer in a range from 0 to i-1; M, i, w, and h are positive integers; i is not greater than M, and a value of i is not 1; and in the virtual coordinate system, a position, in the picture, of a pixel set basic unit at the bottom-right corner of the current block is used as an origin, a straight line on which the bottom boundary of the current block is located is used as a horizontal coordinate axis with a rightward direction as a positive horizontal direction, and a straight line on which the right boundary of the current block is located is used as a vertical coordinate axis with a downward direction as a positive vertical direction.

In one example design, the constructing the chroma intra mode set includes:

constructing the chroma intra mode set based on a luma prediction mode and a determined chroma prediction mode of a picture block spatially neighboring the current block, where a quantity of candidate chroma prediction modes included in the chroma intra mode set does not reach a preset value; and sequentially adding, to the chroma intra mode set, a chroma prediction mode of a sub-block in the center of a co-located block and a chroma prediction mode of a spatial neighboring block at the bottom-right corner of the co-located block, until the quantity of candidate chroma prediction modes included in the chroma intra mode set reaches the preset value, where the sub-block is a basic unit for storing prediction information; the co-located block is a picture block, whose size, shape, and position are all the same as those of the current block, in a reference picture temporally neighboring to the picture in which the current block is located; and the candidate chroma prediction modes included in the chroma intra mode set are different from each other.

In one example design, after the chroma prediction mode of the sub-block in the center of the co-located block and the chroma prediction mode of the spatial neighboring block at the bottom-right corner of the co-located block are sequentially added to the chroma intra mode set, the quantity of candidate chroma prediction modes included in the chroma intra mode set does not reach the preset value, the method further includes:

sequentially adding, in ascending order of the group numbers, chroma prediction modes of picture blocks not spatially adjacent to the current block to the chroma intra mode set, until the quantity of candidate chroma prediction modes in the chroma intra mode set reaches the preset value, where the candidate chroma prediction modes in the chroma intra mode set are different from each other.

In one example design, after the chroma prediction mode of the sub-block in the center of the co-located block and the chroma prediction mode of the spatial neighboring block at the bottom-right corner of the co-located block are sequentially added to the chroma intra mode set, the quantity of candidate chroma prediction modes included in the chroma intra mode set does not reach the preset value, the method further includes:

sequentially adding, in ascending order of distances to the origin from picture blocks not spatially adjacent to the current block, chroma prediction modes of the picture blocks not spatially adjacent to the current block to the chroma intra mode set, where the distance is a sum of absolute values of a horizontal coordinate and a vertical coordinate, in the virtual coordinate system, of a pixel set basic unit in a preset position in the picture block not spatially adjacent to the current block.

In one example design, the sequentially adding the chroma prediction modes of the picture blocks not spatially adjacent to the current block to the chroma intra mode set includes:

sequentially adding, to the chroma intra mode set in order of picture blocks in which pixel set basic units in the following coordinate positions in the virtual coordinate system are located, the determined chroma prediction modes of the picture blocks not spatially adjacent to the current block, until the quantity of candidate chroma prediction modes in the chroma intra mode set reaches the preset value: $(-2 \times w, 0)$, $(0, -2 \times h)$, $(1, -2 \times h)$, $(-2 \times w, 1)$, $(-w, -2 \times h)$, $(-2 \times w, -h)$, $(-2 \times w, h+1)$, $(w+1, -2 \times h)$, $(-2 \times w, -2 \times h)$, $(-3 \times w, 0)$, $(0, -3 \times h)$, $(1, -3 \times h)$, $(-3 \times w, 1)$, $(-w, -3 \times h)$, $(-3 \times w, -h)$, $(w+1, -3 \times h)$, $(-3 \times w, h+1)$, $(-2 \times w, -3 \times h)$, $(-3 \times w, -2 \times h)$, $(2 \times w+1, -3 \times h)$, $(-3 \times w, 2 \times h+1)$, and $(-3 \times w, -3 \times h)$.

In one example design, the constructing the chroma intra mode set includes:

constructing the chroma intra mode set based on a luma prediction mode of the current block and a determined chroma prediction mode of a picture block spatially neighboring the current block in the picture in which the current block is located, where a quantity of candidate chroma prediction modes included in the chroma intra mode set does not reach a preset value; and sequentially adding, in ascending order of the group numbers, determined chroma prediction modes of picture blocks not spatially adjacent to the current block to the chroma intra mode set, until the quantity of candidate chroma prediction modes in the chroma intra mode set reaches the preset value, where the candidate chroma prediction modes in the chroma intra mode set are different from each other.

In one example design, after the determined chroma prediction modes of the picture blocks not spatially adjacent to the current block are sequentially added to the chroma intra mode set, the quantity of candidate chroma prediction modes included in the chroma intra mode set does not reach the preset value, the method further includes:

sequentially adding, to the chroma intra mode set, a chroma prediction mode of a sub-block in the center of a co-located block and a chroma prediction mode of a spatial neighboring block at the bottom-right corner of the co-located block, until the quantity of candidate chroma prediction modes included in the chroma intra mode set reaches the preset value.

According to a fourth aspect, an apparatus for intra prediction of a picture block is provided, including:

a receiving unit, configured to receive a bitstream;

a construction unit, configured to construct a first luma intra mode set for a current block, where the first luma intra mode set is a subset of a plurality of preset candidate luma prediction modes; and the first luma intra mode set includes a determined luma prediction mode of a picture block that is not spatially adjacent to the current block in a picture in which the current block is located and/or a determined luma prediction mode of a picture block that temporally neighbors to the current block in the picture in which the current block is located;

a parsing unit, configured to: parse the received bitstream to obtain a first identifier; and when the first identifier indicates that a luma prediction mode of the current block belongs to the first luma intra mode set, parse the bitstream to obtain a second identifier, where the second identifier is used to indicate that a candidate luma prediction mode in the first luma intra mode set is used as the luma prediction mode of the current block; and a calculation unit, configured to obtain a luma prediction value of the current block based on the luma prediction mode of the current block.

In one example design, the picture in which the current block is located includes at least two rows of coding tree units (CTUs), and a size of the current block is not greater than a size of a coding tree unit in which the current block is located; and a difference between a number of a row, in the picture, of the coding tree unit in which the current block is located and a number of a row, in the picture, of a coding tree unit in which the picture block not spatially adjacent to the current block is located is less than N, where N is an integer greater than 1.

In one example design, the current block has a width of w and a height of h, the picture in which the current block is located includes M groups of picture blocks not spatially adjacent to the current block, and each group of picture blocks not spatially adjacent to the current block has a group number, where a picture block with a group number i includes picture blocks in which pixel set basic units in the following coordinate positions in a virtual coordinate system are located: $(-i \times w, -i \times h)$, $(1+m \times w, -i \times h)$, $(-m \times w, -i \times h)$, $(-i \times w, -m \times h)$, and $(-i \times w, m \times h+1)$, where m is an integer in a range from 0 to i−1; M, i, w, and h are positive integers; i is not greater than M, and a value of i is not 1; and in the virtual coordinate system, a position, in the picture, of a pixel set basic unit at the bottom-right corner of the current block is used as an origin, a straight line on which the bottom boundary of the current block is located is used as a horizontal coordinate axis with a rightward direction as a positive horizontal direction, and a straight line on which the right boundary of the current block is located is used as a vertical coordinate axis with a downward direction as a positive vertical direction.

In one example design, the construction unit is specifically configured to:

construct the first luma intra mode set based on a determined luma prediction mode and a non-directional prediction mode of a picture block adjacent to the current block, where a quantity of candidate luma prediction modes included in the first luma intra mode set does not reach a preset value; and sequentially add, to the first luma intra mode set, a luma prediction mode of a sub-block in the center of a co-located block and a luma prediction mode of a spatial neighboring block at the bottom-right corner of the co-located block, until the quantity of candidate luma prediction modes included in the first luma intra mode set reaches the preset value, where the sub-block is a basic unit for storing prediction information; the co-located block is a picture block, whose size, shape, and position are all the same as those of the current block, in a reference picture temporally neighboring to the picture in which the current block is located; and the candidate luma prediction modes included in the first luma intra mode set are different from each other.

In one example design, after the luma prediction mode of the sub-block in the center of the co-located block and the luma prediction mode of the spatial neighboring block at the bottom-right corner of the co-located block are sequentially added to the first luma intra mode set, the quantity of candidate luma prediction modes included in the first luma intra mode set does not reach the preset value, the construction unit is further configured to:

sequentially add, in ascending order of the group numbers, determined luma prediction modes of picture blocks not spatially adjacent to the current block to the first luma intra mode set, until the quantity of candidate luma prediction modes in the first luma intra mode set reaches the preset value, where the candidate luma prediction modes in the first luma intra mode set are different from each other.

In one example design, after the luma prediction mode of the sub-block in the center of the co-located block and the luma prediction mode of the spatial neighboring block at the bottom-right corner of the co-located block are sequentially added to the first luma intra mode set, the quantity of candidate luma prediction modes included in the first luma intra mode set does not reach the preset value, the construction unit is further configured to:

sequentially add, in ascending order of distances to the origin from picture blocks not spatially adjacent to the current block, determined luma prediction modes of the picture blocks not spatially adjacent to the current block to the first luma intra mode set, where the distance is a sum of absolute values of a horizontal coordinate and a vertical coordinate, in the virtual coordinate system, of a pixel set basic unit in a preset position in the picture block not spatially adjacent to the current block.

In one example design, when sequentially adding the determined luma prediction modes of the picture blocks not spatially adjacent to the current block to the first luma intra mode set, the construction unit is specifically configured to:

sequentially add, to the first luma intra mode set in order of picture blocks in which pixel set basic units in the following coordinate positions in the virtual coordinate system are located, the determined luma prediction modes of the picture blocks not spatially adjacent to the current block, until the quantity of candidate luma prediction modes in the first luma intra mode set reaches the preset value: (−2×w,0), (0,−2×h), (1,−2×h), (−2×w,1), (−w,−2×h), (−2×w,−h), (−2×w,h+1), (w+1,−2×h), (−2×w,−2×h), (−3×w,0), (0,−3×h), (1,−3×h), (−3×w,1), (−w,−3×h), (−3×w,−h), (w+1,−3×h), (−3×w,h+1), (−2×w,−3×h), (−3×w,−2×h), (2×w+1,−3×h), (−3×w,2×h+1), and (−3×w,−3×h).

According to a fifth aspect, this application provides an apparatus for intra prediction of a picture block, including:

a receiving unit, configured to receive a bitstream;

a construction unit, configured to construct a first luma intra mode set for a current block, where the first luma intra mode set is a subset of a plurality of preset candidate luma prediction modes;

a parsing unit, configured to parse the received bitstream to obtain a first identifier; where the construction unit is further configured to: when the first identifier indicates that a luma prediction mode of the current block does not belong to the first luma intra mode set, construct a second luma intra mode set, where the second luma intra mode set is a subset of the plurality of preset candidate luma prediction modes, there is no intersection between the second luma intra mode set and the first luma intra mode set, and the second luma intra mode set includes a determined luma prediction modes of a picture block that is not spatially adjacent to the current block and/or a determined luma prediction mode of a picture block that temporally neighbors to the current block; and the parsing unit is further configured to: when the second identifier indicates that the luma prediction mode of the current block belongs to the second luma intra mode set, parse the bitstream to obtain a third identifier, where the third identifier is used to indicate that a candidate luma prediction mode in the second luma intra mode set is used as the luma prediction mode of the current block; and a calculation unit, configured to obtain a luma prediction value of the current block based on the luma prediction mode of the current block.

In one example design, the picture in which the current block is located includes at least two rows of coding tree units (CTUs), and a size of the current block is not greater than a size of a coding tree unit in which the current block is located; and a difference between a number of a row, in the picture, of the coding tree unit in which the current block is located and a number of a row, in the picture, of a coding tree unit in which the picture block not spatially adjacent to the current block is located is less than N, where N is an integer greater than 1.

In one example design, the current block has a width of w and a height of h, the picture in which the current block is located includes M groups of picture blocks not spatially adjacent to the current block, and each group of picture blocks not spatially adjacent to the current block has a group number, where a picture block with a group number i includes picture blocks in which pixel set basic units in the following coordinate positions in a virtual coordinate system are located: (−i×w,−i×h), (1+m×w,−i×h), (−m×w,−i×h), (−i×w,−m×h), and (−i×w,m×h+1), where m is an integer in a range from 0 to i−1; M, i, w, and h are positive integers; i is not greater than M, and a value of i is not 1; and in the virtual coordinate system, a position, in the picture, of a pixel set basic unit at the bottom-right corner of the current block is used as an origin, a straight line on which the bottom boundary of the current block is located is used as a horizontal coordinate axis with a rightward direction as a positive horizontal direction, and a straight line on which the right boundary of the current block is located is used as a vertical coordinate axis with a downward direction as a positive vertical direction.

In one example design, when constructing the second luma intra mode set, the construction unit is specifically configured to:

sequentially add, to the second luma intra mode set, a luma prediction mode of a sub-block in the center of a co-located block and a luma prediction mode of a spatial neighboring block at the bottom-right corner of the co-located block, until a quantity of candidate luma prediction modes included in the second luma intra mode set reaches a preset value, where the sub-block is a basic unit for storing prediction information; the co-located block is a picture block, whose size, shape, and position are all the same as those of the current block, in a reference picture temporally neighboring to the picture in which the current block is located; and the candidate luma prediction modes included in the second luma intra mode set are different from each other.

In one example design, after the luma prediction mode of the sub-block in the center of the co-located block and the luma prediction mode of the spatial neighboring block at the bottom-right corner of the co-located block are sequentially added to the second luma intra mode set, the quantity of candidate luma prediction modes included in the second luma intra mode set does not reach the preset value, the construction unit is further configured to:

sequentially add, in ascending order of the group numbers, determined luma prediction modes of picture blocks not spatially adjacent to the current block to the second luma intra mode set, until the quantity of candidate luma prediction modes in the second luma intra mode set reaches the preset value, where the candidate luma prediction modes in the second luma intra mode set are different from each other.

In one example design, after the luma prediction mode of the sub-block in the center of the co-located block and the luma prediction mode of the spatial neighboring block at the bottom-right corner of the co-located block are sequentially added to the second luma intra mode set, the quantity of candidate luma prediction modes included in the second luma intra mode set does not reach the preset value, the construction unit is further configured to:

sequentially add, in ascending order of distances to the origin from picture blocks not spatially adjacent to the current block, determined luma prediction modes of the picture blocks not spatially adjacent to the current block to the second luma intra mode set, where the distance is a sum of absolute values of a horizontal coordinate and a vertical coordinate, in the virtual coordinate system, of a pixel set basic unit in a preset position in the picture block not spatially adjacent to the current block.

In one example design, when sequentially adding the determined luma prediction modes of the picture blocks not spatially adjacent to the current block to the second luma intra mode set, the construction unit is specifically configured to:

sequentially add, to the second luma intra mode set in order of picture blocks in which pixel set basic units in the following coordinate positions in the virtual coordinate system are located, the determined luma prediction modes of the picture blocks not spatially adjacent to the current block, until the quantity of candidate luma prediction modes in the second luma intra mode set reaches the preset value: $(-2\times w, 0)$, $(0, -2\times h)$, $(1, -2\times h)$, $(-2\times w, 1)$, $(-w, -2\times h)$, $(-2\times w, -h)$, $(-2\times w, h+1)$, $(w+1, -2\times h)$, $(-2\times w, -2\times h)$, $(-3\times w, 0)$, $(0, -3\times h)$, $(1, -3\times h)$, $(-3\times w, 1)$, $(-w, -3\times h)$, $(-3\times w, -h)$, $(w+1, -3\times h)$, $(-3\times w, h+1)$, $(-2\times w, -3\times h)$, $(-3\times w, -2\times h)$, $(2\times w+1, -3\times h)$, $(-3\times w, 2\times h+1)$, and $(-3\times w, -3\times h)$.

According to a sixth aspect, this application provides an apparatus for intra prediction of a picture block, including:

a receiving unit, configured to receive a bitstream;

a parsing unit, configured to parse the received bitstream to obtain a first identifier;

a construction unit, configured to: when the first identifier indicates that a chroma prediction mode of a current block is not a cross-component linear model (CCLM) mode, construct a chroma intra mode set for the current block, where the chroma intra mode set includes a determined chroma prediction mode of a picture block that is not spatially adjacent to the current block in a picture in which the current block is located and/or a determined chroma prediction mode of a picture block that temporally neighbors to the current block in the picture in which the current block is located; where the parsing unit is further configured to parse the bitstream to obtain a second identifier, where the second identifier is used to indicate that a candidate chroma prediction mode in the chroma intra mode set is used as the chroma prediction mode of the current block; and a calculation unit, configured to obtain a chroma prediction value of the current block based on the chroma prediction mode of the current block.

In one example design, the picture in which the current block is located includes at least two rows of coding tree units (CTUs), and a size of the current block is not greater than a size of a coding tree unit in which the current block is located; and a difference between a number of a row, in the picture, of the coding tree unit in which the current block is located and a number of a row, in the picture, of a coding tree unit in which the picture block not spatially adjacent to the current block is located is less than N, where N is an integer greater than 1.

In one example design, the current block has a width of w and a height of h, the picture in which the current block is located includes M groups of picture blocks not spatially adjacent to the current block, and each group of picture blocks not spatially adjacent to the current block has a group number, where a picture block with a group number i includes picture blocks in which pixel set basic units in the following coordinate positions in a virtual coordinate system are located: $(-i\times w, -i\times h)$, $(1+m\times w, -i\times h)$, $(-m\times w, -i\times h)$, $(-i\times w, -m\times h)$, and $(-i\times w, m\times h+1)$, where m is an integer in a range from 0 to i−1; M, i, w, and h are positive integers; i is not greater than M, and a value of i is not 1; and in the virtual coordinate system, a position, in the picture, of a pixel set basic unit at the bottom-right corner of the current block is used as an origin, a straight line on which the bottom boundary of the current block is located is used as a horizontal coordinate axis with a rightward direction as a positive horizontal direction, and a straight line on which the right boundary of the current block is located is used as a vertical coordinate axis with a downward direction as a positive vertical direction.

In one example design, the construction unit is specifically configured to:

construct the chroma intra mode set based on a luma prediction mode and a determined chroma prediction mode of a picture block spatially neighboring the current block, where a quantity of candidate chroma prediction modes included in the chroma intra mode set does not reach a preset value; and sequentially add, to the chroma intra mode set, a chroma prediction mode of a sub-block in the center of a co-located block and a chroma prediction mode of a spatial neighboring block at the bottom-right corner of the co-located block, until the quantity of candidate chroma prediction modes included in the chroma intra mode set reaches the preset value, where the sub-block is a basic unit for storing prediction information; the co-located block is a picture block, whose size, shape, and position are all the same as those of the current block, in a reference picture temporally neighboring to the picture in which the current block is located; and the candidate chroma prediction modes included in the chroma intra mode set are different from each other.

In one example design, after the chroma prediction mode of the sub-block in the center of the co-located block and the chroma prediction mode of the spatial neighboring block at the bottom-right corner of the co-located block are sequentially added to the chroma intra mode set, the quantity of candidate chroma prediction modes included in the chroma intra mode set does not reach the preset value, the construction unit is further configured to:

sequentially add, in ascending order of the group numbers, chroma prediction modes of picture blocks not spatially adjacent to the current block to the chroma intra mode set, until the quantity of candidate chroma prediction modes in the chroma intra mode set reaches the preset value, where the candidate chroma prediction modes in the chroma intra mode set are different from each other.

In one example design, after the chroma prediction mode of the sub-block in the center of the co-located block and the chroma prediction mode of the spatial neighboring block at the bottom-right corner of the co-located block are sequentially added to the chroma intra mode set, the quantity of candidate chroma prediction modes included in the chroma intra mode set does not reach the preset value, the construction unit is further configured to:

sequentially add, in ascending order of distances to the origin from picture blocks not spatially adjacent to the current block, chroma prediction modes of the picture blocks not spatially adjacent to the current block to the chroma intra mode set, where the distance is a sum of absolute values of a horizontal coordinate and a vertical coordinate, in the virtual coordinate system, of a pixel set basic unit in a preset position in the picture block not spatially adjacent to the current block.

In one example design, when sequentially adding the chroma prediction modes of the picture blocks not spatially adjacent to the current block to the chroma intra mode set, the construction unit is specifically configured to:

sequentially add, to the chroma intra mode set in order of picture blocks in which pixel set basic units in the following coordinate positions in the virtual coordinate system are located, the determined chroma prediction modes of the picture blocks not spatially adjacent to the current block, until the quantity of candidate chroma prediction modes in the chroma intra mode set reaches the preset value: (−2×w, 0), (0,−2×h), (1,−2×h), (−2×w,1), (−w,−2×h), (−2×w,−h), (−2×w,h+1), (w+1,−2×h), (−2×w,−2×h), (−3×w,0), (0,−3×h), (1,−3×h), (−3×w,1), (−w,−3×h), (−3×w,−h), (w+1,−3×h), (−3×w,h+1), (−2×w,−3×h), (−3×w,−2×h), (2×w+1,−3×h), (−3×w,2×h+1), and (−3×w,−3×h).

According to a seventh aspect, an embodiment of this application provides an apparatus. The apparatus may be an encoder, and includes a processor and a memory. The memory is configured to store an instruction. When the apparatus runs, the processor executes the instruction stored in the memory, so that the apparatus performs the method provided in any one of the first aspect or the designs of the first aspect, or any one of the second aspect or the designs of the second aspect, or any one of the third aspect or the designs of the third aspect. It should be noted that the memory may be integrated into the processor or may be independent of the processor.

According to an eighth aspect, an embodiment of this application provides an apparatus. The apparatus may be a decoder, and includes a processor and a memory. The memory is configured to store an instruction. When the apparatus runs, the processor executes the instruction stored in the memory, so that the apparatus performs the method provided in any one of the first aspect or the designs of the first aspect, or any one of the second aspect or the designs of the second aspect, or any one of the third aspect or the designs of the third aspect. It should be noted that the memory may be integrated into the processor or may be independent of the processor.

According to a ninth aspect, an embodiment of this application further provides a readable storage medium. The readable storage medium stores a program or an instruction. When the program or the instruction is run on a computer, the method in any one of the foregoing aspects is performed.

According to a tenth aspect, an embodiment of this application further provides a computer program product including an instruction. When the computer program product runs on a computer, the computer is enabled to perform the method described in any one of the foregoing aspects.

According to an eleventh aspect, an embodiment of this application provides a chip. The chip is connected to a memory, and is configured to read and execute a software program stored in the memory, to implement the method described in any one of the aspects.

In addition, for technical effects brought by any design manner of the second aspect to the eleventh aspect, refer to technical effects brought by different design manners of the first aspect. Details are not described herein again.

DESCRIPTION OF EMBODIMENTS

Figure 1:
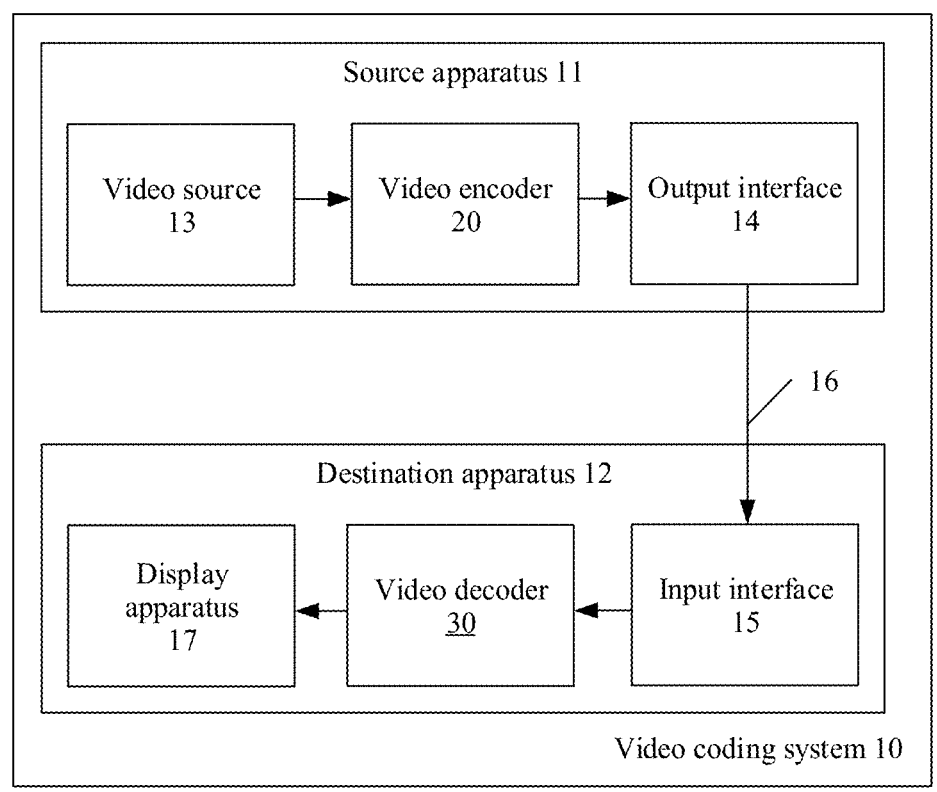
FIG. 1 is a schematic structural diagram of a video coding system according to an embodiment of this application.

The following describes example technical solutions in various embodiments in accordance with the present disclosure with reference to the accompanying drawings in the embodiments of this application.

In one example implementation, in accordance with the present disclosure, a set (where the set may also be referred to as a list) of most probable intra prediction modes (MPMs) in intra prediction modes and a set of selected intra prediction modes (selected modes) are constructed, and a chroma intra prediction mode (which may be referred to as a set of conventional chroma intra modes in this application) is improved. For example, according to some video coding technologies, a video encoder may construct the set of MPMs or selected modes or the set of conventional chroma intra modes before determining and signalling intra prediction information of a current encoding block; or a video decoder may construct the set of MPMs or selected modes or the set of conventional chroma intra modes before determining and receiving intra prediction information of a current decoding block. The present disclosure relates to the construction of the set of MPMs or selected modes or the set of conventional chroma intra modes, so as to select a proper method to encode and decode an intra prediction mode. In this way, prior information obtained in a coding process is more effectively used, so that coding performance is improved.

It should be noted that a capacity of the set of MPMs or selected modes or a capacity of the set of conventional chroma intra modes is limited. For differentiation, the capacity of the set of MPMs is a first preset value, the capacity of the set of selected modes is a second preset value, and the capacity of the set of conventional chroma intra modes is a third preset value.

In one example implementation, candidate luma intra prediction modes are classified into luma intra prediction modes in the set of MPMs and remaining luma intra prediction modes. The video encoder may generate, from the set of MPMs, a list of MPMs in order (for example, a decoding order) in which the MPMs appear in a picture or a slice of video data. The list includes an intra prediction mode. In another feasible implementation, the video decoder may check intra prediction modes of spatial adjacent or non-adjacent blocks, or temporal neighboring blocks to generate a list of MPMs. The video encoder may signal the MPMs based on indexes of the generated list without ordering or reordering the MPMs in the list. The video decoder may perform the same process to generate a list of MPMs, obtain indexes of the list from an encoded bitstream, and select an MPM from the list based on the indexes without ordering or reordering the MPMs in the list. In one example implementation, candidate luma intra prediction modes are classified into intra prediction modes in the set of MPMs, luma intra prediction modes in the set of selected modes, and remaining luma intra prediction modes. The remaining luma intra prediction modes may also be referred to as luma intra prediction modes in a set of non-selected modes. The intra prediction modes in the set of selected modes are processed by using a same principle as that for processing the intra prediction modes in the set of MPMs. Details are not described again. In one example implementation, candidate chroma intra prediction modes are classified into chroma intra prediction modes in the set of conventional chroma intra modes and remaining chroma intra prediction modes. The video encoder may check intra prediction modes of spatial adjacent or non-adjacent blocks or temporal neighboring blocks to generate the set of conventional chroma intra modes.

In one example implementation, for illustration, the video decoder may first check whether an intra prediction mode of a block located on the left of a current decoding block (referred to as a "left neighboring block" herein) is the same as an intra prediction mode of the current block. The video decoder may then check whether an intra prediction mode of a block above the current decoding block (referred to as an "upper neighboring block" herein) is the same as the intra prediction mode of the current block. In this implementation, in accordance with the present disclosure, the intra prediction mode of the left neighboring block may have an index of 0 in the list of MPMs that is maintained by the video decoder, and the intra prediction mode of the upper neighboring block may have an index of 1 in the list. In this case, the video encoder may signal the index 0 of the intra mode of the left neighboring block and the index 1 of the upper neighboring block regardless of whether an actual intra prediction mode number (for example, a predefined mode number specified in a video coding standard) of the left neighboring block is greater than that of the upper neighboring block. Alternatively, if the video decoder checks the intra prediction mode of the upper neighboring block before checking the intra prediction mode of the left neighboring block, the video decoder may signal the index 0 of the upper neighboring block and the index 1 of the left neighboring block. In any case, according to these feasible implementations and aspects of this application, the video encoder may signal indexes of intra modes without reordering or ordering the intra prediction modes in the list. In some feasible implementations, if an intra mode is not one of the MPMs, ordering may be applied to intra prediction mode decoding. In other words, when signaling intra prediction modes that are not MPMs, the video encoder may order a list of the intra prediction modes or modify a list of the intra prediction modes in another manner. In this application, an order in which the video decoder checks intra prediction modes of neighboring blocks (referred to as a "check order" in this specification) may be used to implicitly derive an intra prediction mode based on statistical data collected for intra prediction modes of previously decoded blocks. In other feasible implementations, the video decoder may derive a check order based on availability of neighboring blocks. In a further feasible implementation, the video encoder may signal an explicit indication of the check order (and the video decoder may obtain the check order from an encoded bitstream). Similarly, the set of selected modes and the set of conventional chroma intra modes are processed by using a similar method and one example implementation, and details are not described again.

A solution for intra prediction of a picture block provided in various embodiments in accordance with the present disclosure may be applied to video picture encoding or decoding. FIG. 1 is a schematic block diagram of a video coding system 10 according to an embodiment of this application. As shown in FIG. 1, the system 10 includes a source apparatus 11 and a destination apparatus 12. The source apparatus 11 generates encoded video data and sends the encoded video data to the destination apparatus 12. The destination apparatus 12 is configured to receive the encoded video data, decode the encoded video data, and display decoded video data. The source apparatus 11 and the destination apparatus 12 may include any one of a wide range of apparatuses, including a desktop computer, a laptop computer, a tablet computer, a set-top box, a mobile phone such as a so-called "smart" phone, a so-called "smart" touch panel, a television, a camera, a display apparatus, a digital media player, a video gaming console, a video streaming transmission apparatus, and the like.

The destination apparatus 12 may receive to-be-decoded encoded video data via a link 16. Any kind of medium or apparatus capable of transmitting the encoded video data from the source apparatus 11 to the destination apparatus 12 may be included on the link 16. In one example implementation, a communications medium enabling the source apparatus 11 to directly transmit the encoded video data to the destination apparatus 12 in real time may be included on the link 16. The encoded video data may be modulated according to a communications standard (for example, a wireless communication protocol) and transmitted to the destination apparatus 12. The communications medium may include any wireless or wired communications medium, for example, a radio spectrum or one or more physical transmission lines. The communications medium may constitute a part of a packet-based network (for example, a local area network, a wide area network, or a global network of the internet). The communications medium may include a router, a switch, a base station, or any other device for facilitating communication from the source apparatus 11 to the destination apparatus 12.

In some embodiments, the video coding system 10 further includes a storage apparatus. Encoded data may be output to the storage apparatus through an output interface 14. Similarly, the encoded data may be accessed from the storage apparatus through an input interface 15. The storage apparatus may include any one of a variety of distributed or local data storage media, for example, a hard disk drive, a Blu-ray disc, a DVD, a CD-ROM, a flash memory, a volatile or non-volatile storage, or any other appropriate digital storage medium used for storing the encoded video data. In another feasible implementation, the storage apparatus may correspond to a file server or another intermediate storage apparatus that is capable of keeping an encoded video generated by the source apparatus 11. The destination apparatus 12 may access the stored video data from the storage apparatus through streaming transmission or downloading. The file server may be any type of server capable of storing the encoded video data and transmitting the encoded video data to the destination apparatus 12. In one example implementation, the file server includes a website server, a file transfer protocol server, a network-attached storage apparatus, or a local disk drive. The destination apparatus 12 may access the encoded video data through any standard data connection including an internet connection. The data connection may include a wireless channel (for example, a Wi-Fi connection), a wired connection (for example, a cable modem), or a combination thereof, that is suitable for accessing the encoded video data stored on the file server. Transmission of the encoded video data from the storage apparatus may be streaming transmission, downloading transmission, or a combination thereof.

Technologies described herein re not necessarily limited to wireless applications or settings. The technologies may be applied to video coding, to support any one of a variety of multimedia applications, for example, over-the-air television broadcasting, cable television transmission, satellite television transmission, streaming video transmission (for example, through the internet), digital video coding for storage on a data storage medium, decoding of digital video stored on a data storage medium, or the like. In some possible implementations, the system 10 may be configured to support unidirectional or bidirectional video transmission, so as to support applications such as video streaming transmission, video playing, video broadcasting, and/or videotelephony.

In one example implementation of FIG. 1, the source apparatus 11 may include a video source 13, a video encoder 20, and the output interface 14. In some applications, the output interface 14 may include a modulator/demodulator (a modem) and/or a transmitter. In the source apparatus 11, the video source 13 may include, for example, the following source devices: a video capturing apparatus (for example, a video camera), an archive including a previously captured video, a video feed-in interface for receiving a video from a video content provider, and/or a computer graphics system for generating computer graphics data as a source video, or a combination thereof. In one example implementation, if the video source 13 is a video camera, the source apparatus 11 and the destination apparatus 12 may constitute a so-called camera phone or a video phone. For example, the technologies described in this application may be applied to video coding, and may be applied to wireless and/or wired applications.

The video encoder 20 may encode a video that is captured or pre-captured, or generated through calculation. The encoded video data may be directly transmitted to the destination apparatus 12 through the output interface 14 of the source apparatus 11. The encoded video data may also be (or alternatively) be stored on the storage apparatus for subsequent access by the destination apparatus 12 or another apparatus for decoding and/or playing.

The destination apparatus 12 includes the input interface 15, a video decoder 30, and a display apparatus 17. In some applications, the input interface 15 may include a receiver and/or a modem. The input interface 15 of the destination apparatus 12 receives the encoded video data via the link 16. The encoded video data transmitted or provided to the storage apparatus via the link 16 may include a plurality of syntactic elements generated by the video encoder 20 for the video decoder 30 to decode video data. These syntax elements may be included in the encoded video data that is transmitted on the communications medium and that is stored in the storage medium or stored on the file server.

The display apparatus 17 may be integrated with the destination apparatus 12 or disposed outside the destination apparatus 12. In some possible implementations, the destination apparatus 12 may include an integrated display apparatus and also be configured to connect to an interface of an external display apparatus. In other possible implementations, the destination apparatus 12 may be a display apparatus. Generally, the display apparatus 17 displays decoded video data to a user, and may include any of a variety of display apparatuses, for example, a liquid crystal display, a plasma display, an organic light-emitting diode display, or another type of display apparatus.

The video encoder 20 and the video decoder 30 may operate according to, for example, a next-generation video coding compression standard (H.266) that is currently being developed, and may comply with an H.266 test model (JEM). Alternatively, the video encoder 20 and the video decoder 30 may operate according to, for example, other dedicated or industrial standards or their extensions of the ITU-T H.265 standard or the ITU-T H.264 standard, where the ITU-T H.265 standard is also referred to as a high efficiency video coding standard. Alternatively, the ITU-T H.264 standard is also referred to as MPEG-4 Part 10, or advanced video coding (AVC). However, the technologies of this application are not limited to any specific coding standard. Other possible implementations of the video compression standard include MPEG-2 and ITU-TH.263.

Although not shown in FIG. 1, in some aspects, the video encoder 20 and the video decoder 30 may be integrated with an audio encoder and an audio decoder, respectively, and may include an appropriate multiplexer-demultiplexer (MUX-DEMUX) unit or other hardware and software to encode both audio and video in a same data stream or separate data streams. If applicable, in some feasible implementations, the MUX-DEMUX unit may comply with the ITU H.223 multiplexer protocol or another protocol such as the user datagram protocol (UDP).

The video encoder 20 and the video decoder 30 each may be implemented as any one of a variety of appropriate encoder circuitry, for example, one or more microprocessors, digital signal processors (DSP), application specific integrated circuits (ASIC), field-programmable gate arrays (FPGA), discrete logic, software, hardware, firmware, or any combination thereof. When some of the technologies are implemented as software, an apparatus may store an instruction for the software into an appropriate non-transitory computer-readable medium, and execute the instruction in a form of hardware by using one or more processors, to implement the technologies in this application. The video encoder 20 and the video decoder 30 each may be included in one or more encoders or decoders, and any one of the one or more encoders or decoders may be integrated as a part of a combined encoder/decoder (CODEC) in a corresponding apparatus.

The JCT-VC has developed the H.265 (HEVC) standard. HEVC standardization is based on an evolved model of a video coding apparatus, and the model is referred to as an HEVC test model (HM). A latest H.265 standard document is available at http://www.itu.int/rec/T-REC-H.265. A latest version of the standard document is H.265 (12/16), and the standard document is incorporated herein by reference in its entirety. In the HM, it is assumed that the video coding apparatus has several additional capabilities compared with an existing algorithm of ITU-TH.264/AVC. For example, H.264 provides nine intra prediction coding modes, whereas the HM can provide up to 35 intra prediction coding modes.

The JVET is committed to developing the H.266 standard. An H.266 standardization process is based on an evolved model of a video coding apparatus, and the model is referred to as an H.266 test model. H.266 algorithm descriptions are available at http://phenix.int-evry.fr/jvet, and latest algorithm descriptions are included in JVET-F1001-v2. This algorithm description document is incorporated herein by reference in its entirety. In addition, reference software for the JEM test model is available at https://jvet.hhi.fraunhofer.de/svn/svn_HMJEMSoftware/, and is also incorporated herein by reference in its entirety.

Generally, as described in an HM working model, a video frame or picture may be split into a sequence of tree blocks including both luma and chroma samples or a sequence of largest coding units (LCU) including both luma and chroma samples, where the LCU is also referred to as CTU. A tree block has a function similar to a macroblock in the H.264 standard. A slice includes several consecutive tree blocks in a decoding order. A video frame or picture may be partitioned into one or more slices. Each tree block can be split into coding units based on a quadtree. For example, a tree block serving as a root node of the quadtree may be split into four child nodes, and each child node may serve as a parent node and be split into four other child nodes. A final non-splittable child node serving as a leaf node of the quadtree includes a decoding node, for example, a decoded video block. In syntactic data associated with a decoded bitstream, a maximum quantity of splittable times of a tree block and a minimum size of a decoding node may be defined.

A coding unit includes a decoding node, a prediction unit (PU), and a transform unit (TU) associated with the decoding node. A size of the CU corresponds to a size of the decoding node, and a shape of the CU needs to be square. The size of the CU may range from 8×8 pixels up to at most 64×64 pixels, or be a larger tree block size. Each CU may include one or more PUs and one or more TUs. For example, syntactic data associated with the CU may describe partitioning of one CU into one or more PUs. Partitioning patterns may vary when the CU is encoded in a skip or direct mode, encoded in an intra prediction mode, or encoded in an inter prediction mode. The PU obtained through partitioning may be in a non-square shape. For example, the syntactic data associated with the CU may also describe partitioning of one CU into one or more TUs based on the quadtree. The TU may be in a square or non-square shape.

The HEVC standard allows TU-based transform, and TUs may be different for different CUs. A size of a TU is usually set based on a size of a PU within a given CU defined for a partitioned LCU. However, this may not always be the case. The size of the TU is generally the same as or less than the size of the PU. In some feasible implementations, a quadtree structure referred to as a "residual quadtree" (RQT) may be used to split a residual sample corresponding to the CU into smaller units. A leaf node of the RQT may be referred to as a TU. A pixel difference associated with the TU may be transformed to generate a transform coefficient, and the transform coefficient may be quantized.

Generally, the PU includes data related to a prediction process. For example, when the PU is encoded in an intra mode, the PU may include data describing the intra prediction mode of the PU. In another feasible implementation, when the PU is encoded in an inter mode, the PU may include data defining a motion vector of the PU. For example, the data defining the motion vector of the PU may describe a horizontal component of the motion vector, a vertical component of the motion vector, a resolution (for example, quarter-pixel precision or one-eighth-pixel precision) of the motion vector, a reference picture to which the motion vector points, and/or a reference picture list (for example, a list 0, a list 1, or a list C) of the motion vector.

Generally, transform and quantization processes are used for the TU. A given CU including one or more PUs may also include one or more TUs. After prediction, the video encoder 20 may calculate a residual value corresponding to the PU. The residual value includes a pixel difference, and the pixel difference may be transformed into a transform coefficient, the transform coefficient is quantized, and the TU is scanned, to generate serialized transform coefficients for entropy decoding. In this application, the term "picture block" is usually used to indicate a decoding node of a CU. In some specific applications, in this application, the term "picture block" may also be used to indicate a tree block including a decoding node, a PU, and a TU. For example, the tree block is an LCU or a CU.

A video sequence usually includes a series of video frames or pictures. For example, a group of pictures (GOP) includes a series of video pictures, one video picture, or a plurality of video pictures. The GOP may include syntactic data in header information of the GOP, in header information of one or more of the pictures, or elsewhere, and the syntactic data describes a quantity of pictures included in the GOP. Each slice of a picture may include slice syntactic data describing a coding mode of the corresponding picture. The video encoder 20 usually performs an operation on a video block in a video slice, to encode video data. The video block may correspond to the decoding node in the CU. A size of the video block may be fixed or changeable, and may vary according to a specified coding standard.

In one example implementation, the HM supports prediction for a variety of PU sizes. Assuming that a size of a specific CU is 2N×2N, the HM supports intra prediction for a PU size of 2N×2N or N×N, and inter prediction for a symmetric PU size of 2N×2N, 2N×N, N×2N, or N×N. The HM also supports asymmetric partitioning for inter prediction for PU sizes of 2N×nU, 2N×nD, nL×2N, and nR×2N. In asymmetric partitioning, the CU is not partitioned in one direction, and is partitioned into two parts in the other direction, where one part occupies 25% of the CU and the other part occupies 75% of the CU. The part occupying 25% of the CU is indicated by an indicator including "n" followed by "U (Up)", "D (Down)", "L (Left)" or "R (Right)". Therefore, for example, "2N×nU" refers to a horizontally partitioned 2N×2N CU, with a 2N×0.5N PU at the top and a 2N×1.5N PU at the bottom.

In various embodiments, "N×N" and "N multiplied by N" may be used interchangeably to indicate a pixel size of a picture block in a vertical dimension and a horizontal dimension, for example, 16×16 pixels or 16 multiplied by 16 pixels. Usually, a 16×16 block has 16 pixels (y=16) in a vertical direction and 16 pixels (x=16) in a horizontal direction. Similarly, an N×N block usually has N pixels in the vertical direction and N pixels in the horizontal direction, where N represents a non-negative integer. Pixels in a block may be arranged in rows and columns. In addition, in a block, a quantity of pixels in the horizontal direction and a quantity of pixels in the vertical direction may be not necessarily the same. For example, a block may include N×M pixels, where M is not necessarily equal to N.

After intra or inter prediction decoding by a PU in a CU, the video encoder 20 may calculate residual data of a TU in the CU. The PU may include pixel data in a space domain (which is also referred to as a pixel domain), and the TU may include a coefficient in a transform domain obtained after transform (for example, discrete cosine transform (DCT), integer transform, wavelet transform, or other conceptually similar transform) is applied to residual video data. The residual data may correspond to a difference between a pixel value of a picture that is not encoded and a prediction value corresponding to the PU. The video encoder 20 may generate a TU including residual data of the CU, and then transform the TU to generate a transform coefficient of the CU.

The JEM model further improves a video picture coding structure. Specifically, a block coding structure referred to as a "quadtree plus binary tree" (QTBT) is introduced. Without using such concepts as CU, PU, and TU in HEVC, the QTBT structure supports a more flexible CU split shape. A CU may be in a square or rectangular shape. Quadtree split is first performed on a CTU, and binary tree split is further performed on a leaf node of the quadtree. In addition, there are two binary tree split modes: symmetric horizontal partitioning and symmetric vertical partitioning. A leaf node of a binary tree is referred to as a CU. A CU in the JEM cannot be further split during prediction and transform. In other words, a CU, a PU, and a TU in the JEM have a same block size. In the existing JEM, a maximum CTU size is 256×256 luma pixels.

In various embodiments, the video encoder may perform intra prediction to reduce spatial redundancy between pictures. As described above, a CU may have one or more prediction units PUs depending on stipulations of different video compression coding standards. In other words, a plurality of PUs may belong to a CU. Alternatively, a PU and a CU have a same size. In this specification, when the PU and the CU have a same size, a partition pattern of the CU is that the CU is not partitioned or the CU is partitioned into one PU, and the PU is uniformly used for description. When the video encoder performs intra prediction, the video encoder may signal intra prediction information for the PU to the video decoder.

In some example implementations, the video encoder 20 and/or the video decoder 30 may identify a so-called "most probable" intra prediction mode during intra prediction decoding. In other words, for example, the video encoder 20 and/or the video decoder 30 may identify intra prediction modes of previously decoded blocks (blocks with determined intra prediction modes may also be referred to as "reference blocks") neighbouring to a current decoding block, and compare these intra prediction modes with an intra prediction mode of the current decoding block (which is referred to as a "current block"). Due to spatial or temporal proximity of neighboring blocks to the current block, there may be a comparatively high probability that intra modes of these reference blocks are the same as or similar to an intra mode of the current block. As described in more detail below, intra prediction modes of a plurality of reference blocks may be considered during identifying of an MPM.

In addition, in some example implementations, the video encoder 20 and/or the video decoder 30 may signal an index used to identifying the MPM. To be specific, as defined according to a coding standard, each intra prediction mode may have an associated intra prediction mode index (an index that is pre-assigned to each mode in the standard instead of temporarily assigned in a coding process), and the intra prediction mode index is used to identify the intra prediction mode as one of a plurality of probable intra prediction modes. For example, the JEM standard can support up to 67 luma intra prediction modes, where an index value (for example, an index value used for looking up a table) is assigned to each luma intra prediction mode, and the index value may be used to identify the intra prediction mode.

Figure 2A:
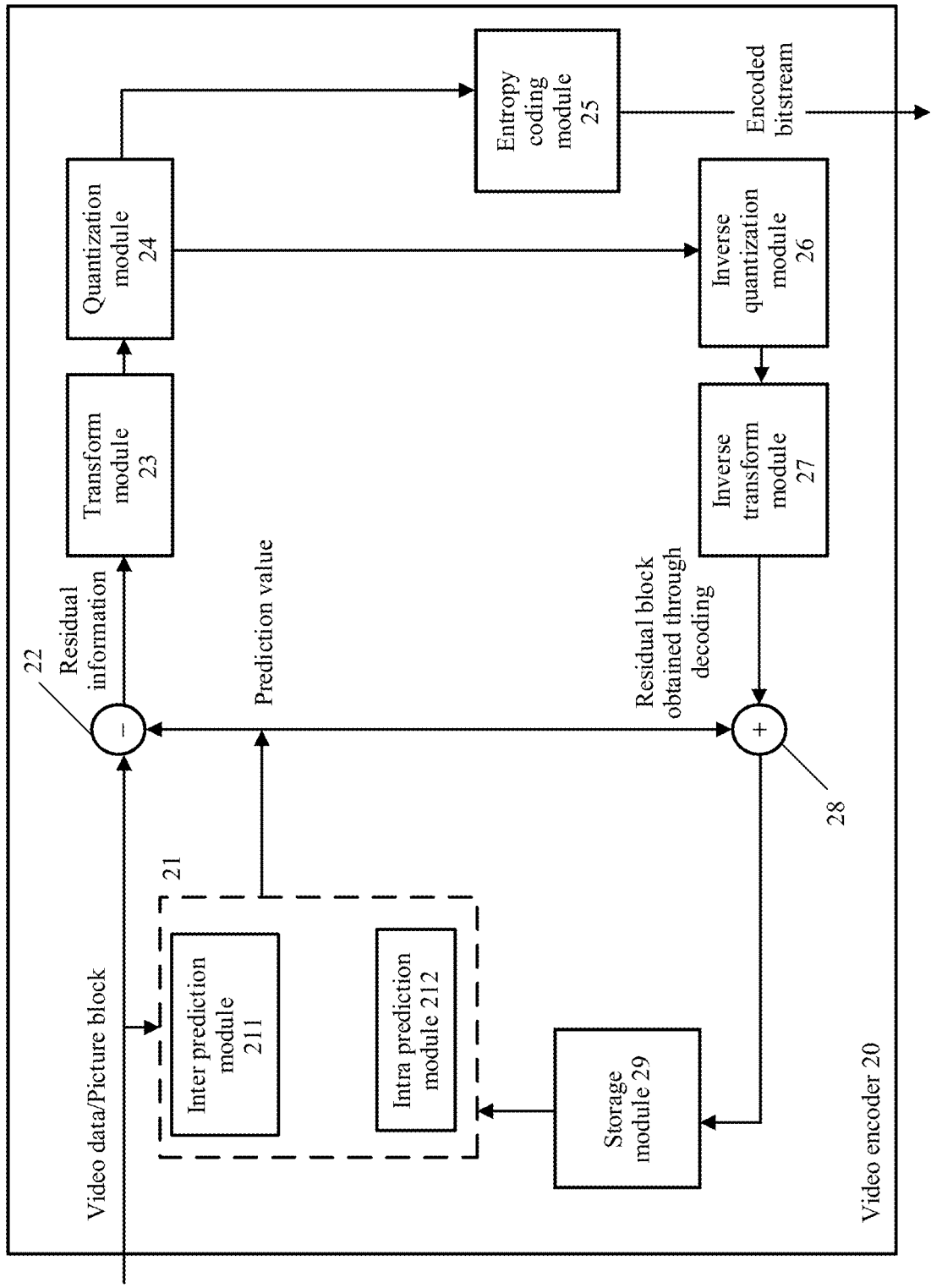
FIG. 2A is a schematic structural diagram of a video encoder according to an embodiment of this application.

FIG. 2A is a schematic block diagram of a video encoder 20 according to an embodiment of this application.

As shown in FIG. 2A, the video encoder 20 may include a prediction module 21, a summator 22, a transform module 23, a quantization module 24, and an entropy coding module 25. In an example, the prediction module 21 may include an inter prediction module 211 and an intra prediction module 212. An internal structure of the prediction module 21 is not limited in this embodiment of this application. In some embodiments, for a video encoder with a hybrid architecture, the video encoder 20 may further include an inverse quantization module 26, an inverse transform module 27, and a summator 28.

In one example implementation of FIG. 2A, the video encoder 20 may further include a storage module 29. It should be understood that the storage module 29 may alternatively be disposed outside the video encoder 20.

In another implementation, the video encoder 20 may further include a filter (not shown in FIG. 2A) to filter a boundary of a picture block, so as to remove an artifact from a reconstructed video picture. When necessary, the filter usually filters an output of the summator 28.

In some embodiments, the video encoder 20 may further include a partitioning unit (not shown in FIG. 2A). The video encoder 20 receives video data, and the partitioning unit partitions the video data into picture blocks. Such partitioning may further include partitioning into slices, picture blocks, or other larger units, and (for example) video block partitioning based on quadtree structures of an LCU and a CU. For example, for the video encoder 20, components for encoding video blocks in a to-be-coded video slice are described. A slice may usually be split into a plurality of picture blocks (or may be split into a set of video blocks referred to as picture blocks).

The prediction module 21 is configured to perform intra or inter prediction on a current coding picture block (a current block for short) to obtain a prediction value (which may be referred to as prediction information in this application) of the current block. Specifically, the inter prediction module 211 included in the prediction module 21 performs inter prediction on the current block, to obtain an inter prediction value. The intra prediction module 212 performs intra prediction on the current block, to obtain an intra prediction value. The inter prediction module 211 needs to try a plurality of reference blocks in a reference picture for the current block. One or more specific reference blocks finally used for prediction is determined through rate-distortion optimization (RDO) or by using another method. In some feasible implementations, the intra prediction module 212 may (for example) encode the current block by using various intra prediction modes during separate coding traversal.

The intra prediction module 212 may calculate ratios of distortions to bit rates of various encoded blocks, to determine a specific intra prediction mode that presents a best rate-distortion value of the block. According to the JEM standard, there may be up to 67 intra prediction modes, and each intra prediction mode may be associated with an index.

This application relates to, for example, intra decoding. Therefore, a particular technology in accordance with the present disclosure may be executed by the intra prediction module 212. In other implementations, one or more other units of the video encoder 20 may additionally or alternatively be responsible for executing the technologies in this application.

For example, the intra prediction module 212 may determine an intra prediction mode of a current coding block (for example, according to a rate-distortion analysis as described above). The intra prediction module 212 may alternatively determine an intra prediction mode or intra prediction modes (referred to as an MPM or MPMs) of one or more previously decoded blocks neighbouring to a current intra decoding block. The intra prediction module 212 may (for example) compare the MPM with an intra mode of the current block, to indicate a determined intra mode of the current block based on a determined intra mode of a neighboring block, as described in more detail below.

After the prediction module 21 generates the prediction value of the current block through inter prediction or intra prediction, the video encoder 20 subtracts the prediction value from the current block, to form residual information. The transform module 23 is configured to transform the residual information. The transform module 23 transforms the residual information into a residual transform coefficient by performing, for example, discrete cosine transform (DCT) or conceptually similar transform (for example, discrete sine transform, DST). The transform module 23 may send the obtained residual transform coefficient to the quantization module 24. The quantization module 24 quantizes the residual transform coefficient to further reduce a bit rate. In some feasible implementations, the quantization module 24 may continue to scan a matrix including a quantized transform coefficient. In some embodiments, the entropy coding module 25 may perform scanning.

After quantization, the entropy coding module 25 may perform entropy coding on a quantized residual transform coefficient to obtain a bitstream. For example, the entropy coding module 25 may perform context-adaptive variable-length coding (CAVLC), context-based adaptive binary arithmetic coding (CABAC), syntax-based context-adaptive binary arithmetic coding (SBAC), probability interval partitioning entropy (PIPE) coding, or another entropy coding method or technology. After the entropy coding module 25 performs entropy coding, an encoded bitstream may be transmitted to the video decoder 30, or stored for subsequent transmission or retrieval by the video decoder 30.

The inverse quantization module 26 and the inverse transform module 27 perform inverse quantization and inverse transform, respectively, to reconstruct a residual block in a pixel domain as a reference block of the reference picture. The summator 28 adds residual information obtained through reconstruction and the prediction value generated by the prediction module 21, to generate a reconstructed block, and uses the reconstructed block as the reference block for storage in the storage module 29. The reference block may be used by the prediction module 21 to perform inter or intra prediction on a block in a subsequent video frame or picture.

It should be understood that another structural variant of the video encoder 20 can be used to encode a video stream. For example, for some picture blocks or picture frames, the video encoder 20 may directly quantize the residual information without processing by the transform module 23 or processing by the inverse transform module 27. In some embodiments, for some picture blocks or picture frames, the video encoder 20 does not generate residual information, and correspondingly, processing by the transform module 23, processing by the quantization module 24, processing by the inverse quantization module 26, and processing by the inverse transform module 27 are not required. In some embodiments, the video encoder 20 may directly store a reconstructed picture block as a reference block without processing by a filter unit. Alternatively, the quantization module 24 and the inverse quantization module 26 in the video encoder 20 may be combined together. In some embodiments, the transform module 23 and the inverse transform module 27 in the video encoder 20 may be combined together. Alternatively, the summator 22 and the summator 28 may be combined together.

Figure 2B:
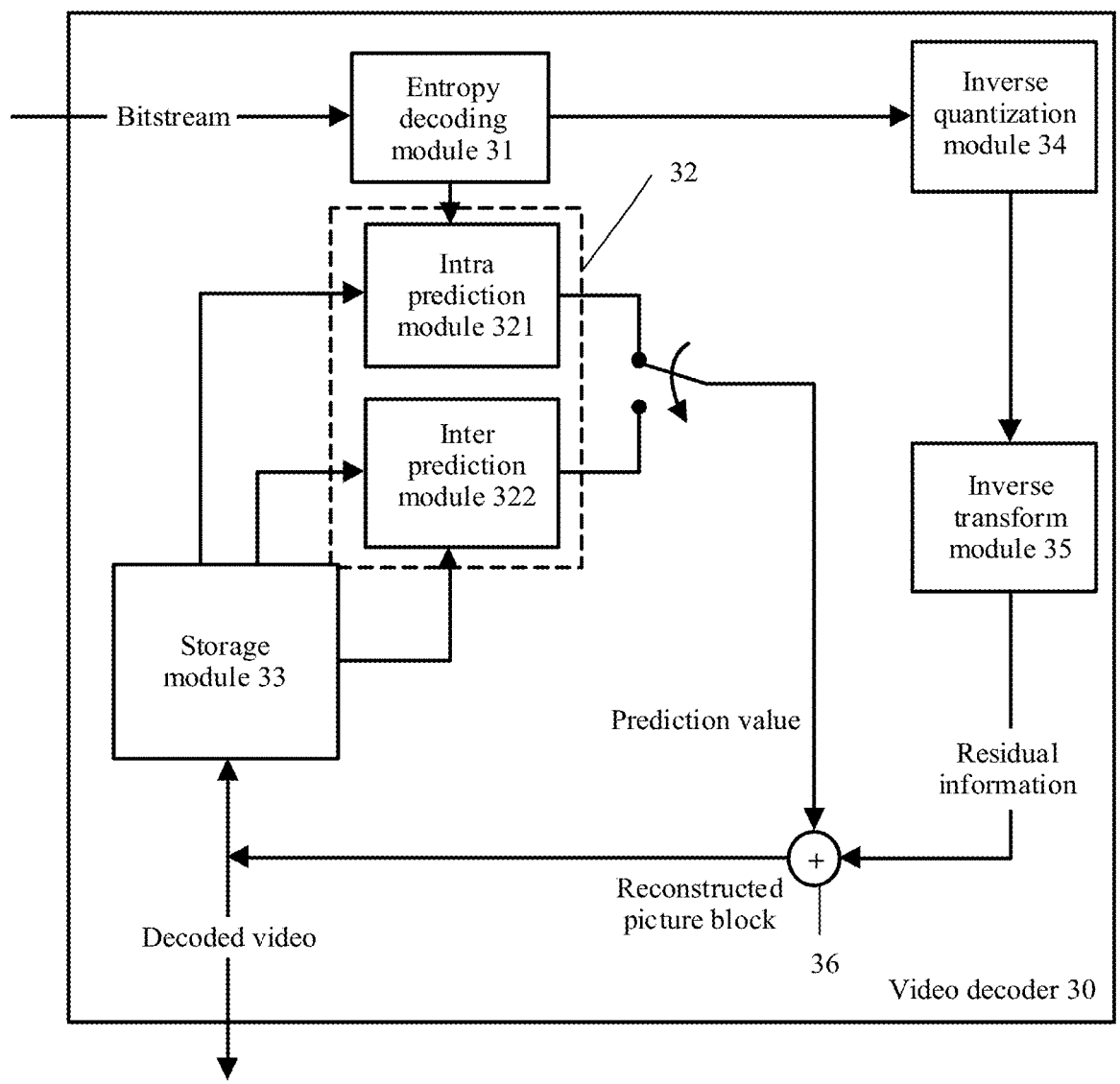
FIG. 2B is a schematic structural diagram of a video decoder according to an embodiment of this application.

FIG. 2B is a schematic block diagram of a video decoder 30 according to one embodiment.

As shown in FIG. 2B, the video decoder 30 may include an entropy decoding module 31, a prediction module 32, an inverse quantization module 34, an inverse transform module 35, and a reconstruction module 36. In an example, the prediction module 32 may include an inter prediction module 322 and an intra prediction module 321. This is not limited in this embodiment of this application.

In one example implementation, the video decoder 30 may further include a storage module 33. It should be understood that the storage module 33 may alternatively be disposed outside the video decoder 30. In some feasible implementations, the video decoder 30 may perform an example decoding process inverse to the encoding process described in the video encoder 20 in FIG. 2A.

During decoding, the video decoder 30 receives a bitstream from the video encoder 20. The entropy decoding module 31, the inverse quantization module 34, and the inverse transform module 35 successively perform entropy decoding, inverse quantization, and inverse transform respectively on the bitstream received by the video decoder 30, to obtain residual information. Then, whether intra prediction or inter prediction is performed for a current block is determined based on the bitstream. If intra prediction is performed, the intra prediction module 321 in the prediction module 32 constructs prediction information according to a used intra prediction method and by using pixel values of reference pixels of reconstructed blocks around the current block. If inter prediction is performed, motion information needs to be obtained through parsing, a reference block is determined from the reconstructed picture blocks based on the motion information obtained through parsing, and pixel values of samples in the reference block are used as the prediction information. (This process is referred to as motion compensation (Motion compensation, MC)). The reconstruction module 36 can obtain reconstruction information by adding the prediction information and the residual information.

As noted in the foregoing, various embodiments relate to, for example, intra decoding. Therefore, a particular technology in accordance with the present disclosure may be executed by the intra prediction module 321. In other example implementations, one or more other units of the video decoder 30 may be responsible for executing the technologies in this application.

For example, the intra prediction module 321 may obtain, from the entropy decoding module 31, an index of a list of MPMs of a current block used to decode video data. The intra prediction module 321 may generate a list, to which the index belongs, by adding the MPM to the list in the same manner as the video encoder 20. Then, the intra prediction module 321 may determine, based on the obtained index, an appropriate intra mode of the current block used to decode the video data. In this manner, when the MPMs are not ordered based on intra mode index values (an index that is pre-assigned to each mode in a standard instead of temporarily assigned in a coding process) of the MPMs, the intra prediction module 321 may determine the appropriate MPM used for decoding the current block.

In some implementations, the video decoder may identify a so-called "most probable" intra prediction mode during intra prediction decoding. In other words, for example, the video encoder (for example, the video encoder 20) may identify intra prediction modes of previously encoded blocks (for example, reference blocks). Due to spatial or temporal proximity of the reference blocks to the current block, there may be a comparatively high probability that the intra prediction modes of these reference blocks are the same as or similar to an intra prediction mode of the current block. As described in more detail below, intra prediction modes of a plurality of reference blocks may be considered during identifying of an MPM.

Figure 3:
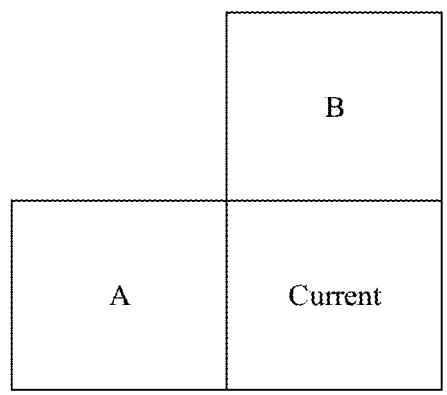
FIG. 3 is a schematic diagram of spatially adjacent blocks according to an embodiment of this application.

FIG. 3 shows one example implementation of a current block ("current CU") and two reference blocks (for example, "A" and "B") that may be considered during intra decoding. For example, a video encoder (for example, the video encoder 20) may consider intra modes associated with the reference block A (which is on the left of the current block) and the reference block B (which is above the current block) as MPMs of the current block. In some feasible implementations, if any one of MPM candidates (for example, for the block A or the block B) is not an intra mode, or is unavailable in another manner (for example, for a block that has not been decoded), the video encoder 20 may assign a default intra mode, for example, a DC mode, to the block. Similarly, in some feasible implementations, a quantity of MPMs may be greater than 2. For example, the video encoder 20 may generate an additional MPM based on intra modes of more than two reference blocks.

If an actual intra mode (which is, for example, calculated by the intra prediction module 212) of the current block is the same as that of the reference block A or the reference block B, the video encoder 20 may signal a 1-bit flag to indicate that the MPM is used to encode the current block (for example, the MPM flag is set to "1").

In addition, in some implementations, the video encoder 20 may signal an index used to identify the MPM. For example, FIG. 4 shows 67 intra modes supported in the JEM standard and an index value assigned to each of the intra modes.

Figure 4:
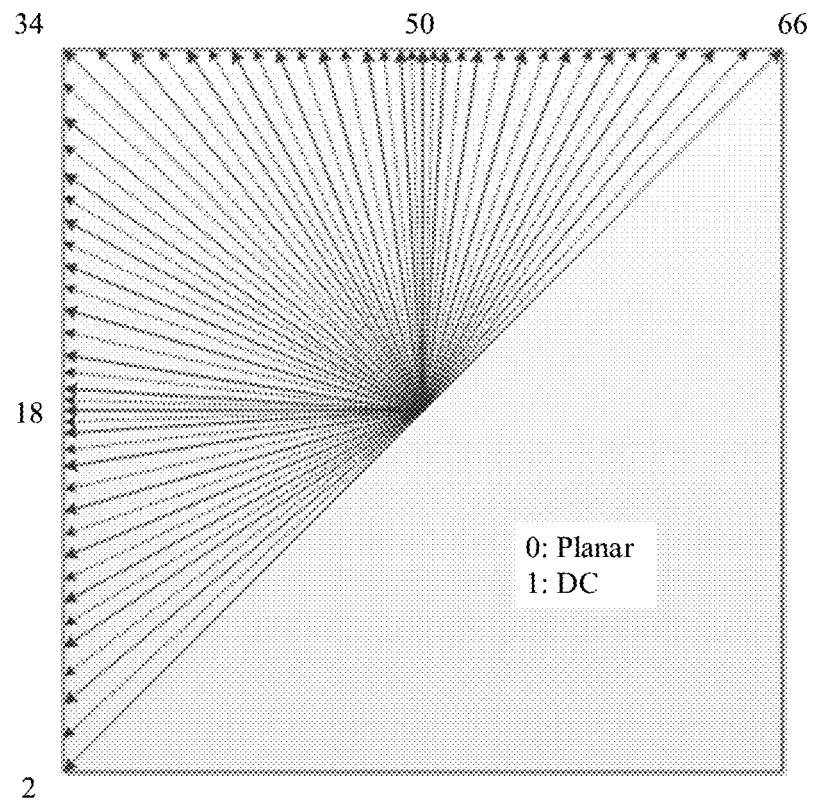
FIG. 4 is a schematic diagram of an intra prediction mode according to an embodiment of this application.

In one example implementation of FIG. 4, a planar mode has an original index value 0, a direct current mode (DC mode) has an original index value 1, and directional prediction modes have original index values 2 to 66. The original index value refers to an index pre-assigned to each mode in a standard instead of temporarily assigned in a coding process.

In a directional prediction mode, a reference pixel is mapped to a sample in a current block in a specific direction (which is marked by using an intra mode index) to obtain a prediction value of a current sample; or for each sample in the current block, a position of the sample is reversely mapped to a reference pixel in a specific direction (which is marked by using an intra mode index), and correspondingly, a pixel value of the reference pixel is a prediction value of a current sample.

A difference from the directional prediction mode lies in that, in the DC mode, an average value of reference pixels is used as a prediction value of a pixel in a current block, while in the planar mode, a prediction value of a current sample is calculated based on pixel values of reference pixels on the above and left of the current sample and pixel values of reference samples on the upper-right side and the bottom-left side of the current sample.

First, several concepts in this application are described, to facilitate understanding by a person skilled in the art.

(1) For ease of description, picture blocks that are in a picture in which a current block is located, that are spatially adjacent to the current block, and whose intra prediction modes have been determined may be briefly referred to as spatially adjacent picture blocks or picture blocks spatially adjacent to the current block. "Spatial neighboring" in the embodiments of this application includes "spatially adjacent" and "spatial non-adjacent".

The picture blocks that are adjacent to the current block and whose intra prediction modes have been determined include a reconstructed block that is located in the same picture as the current block, for which a prediction value is obtained based on an intra prediction mode, and that is adjacent to the current block.

For example, on the left side of the current block, a picture block adjacent to a bottom-left corner of the current block may be included; and on the above side of the current block, picture blocks adjacent to the top-left corner of the current block, and the bottom left, above right, and above left of the current block.

Figure 5:
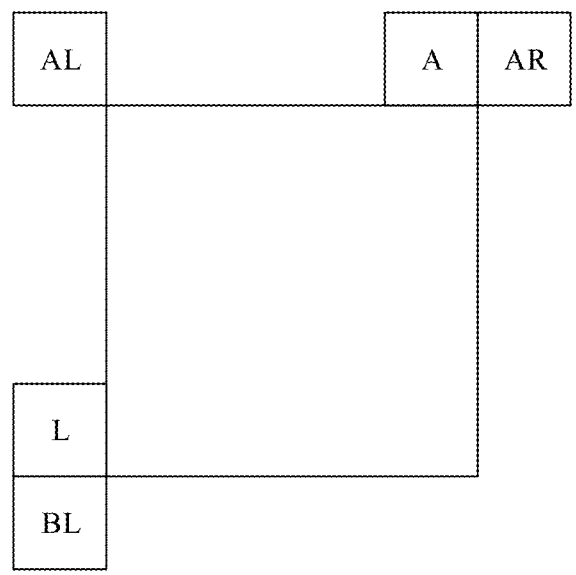
FIG. 5 is a schematic diagram of positions of spatial adjacent blocks according to an embodiment of this application.

For example the picture blocks in (1) may include picture blocks with an intra prediction mode on the left (L), above (A), the bottom left (BL), the above right (AR), and the above left (AL) of the current block shown in FIG. 5.

(2) For ease of description, picture blocks that are in a picture in which a current block is located, that are spatial non-adjacent to the current block, and whose intra prediction modes have been determined may be referred to as spatial non-adjacent picture blocks or picture blocks that are spatially non-adjacent to the current block.

The picture in which the current block is located may be divided into M groups of picture blocks that are not adjacent to the current block and whose intra prediction modes have been determined, each group of picture blocks that are not adjacent to the current block and whose intra prediction modes have been determined has a group number, and the current block has a width of w and a height of h. Picture blocks with a group number i include picture blocks in which pixel set basic units in the following coordinate positions in a virtual coordinate system are located: (−i×w,−i×h), (1+m×w,−i×h), (−m×w,−i×h), (−i×w,−m×h), and (−i×w,m×h+1), where m is an integer in a range from 0 to i−1; M, i, w, and h are positive integers; i is not greater than M, and a value of i is not 1; and in the virtual coordinate system, a position, in the picture, of a pixel set basic unit at a bottom-right corner of the current block is used as an origin, a straight line on which the bottom boundary of the current block is located is used as a horizontal coordinate axis with a rightward direction as a positive horizontal direction, and a straight line on which the right boundary of the current block is located is used as a vertical coordinate axis with a downward direction as a positive vertical direction. For example, as shown in FIG. 6, when the group number i is equal to 1, the picture blocks are picture blocks in a first circle (picture blocks in which a set of pixels marked 1 to 5 is located) neighboring to the current block; when the group number i is equal to 2, the picture blocks are picture blocks in a second circle (picture blocks in which a set of pixels marked 6 to 12 is located) that does not neighbor to the current block; when the group number i is equal to 3, the picture blocks are picture blocks in a third circle (picture blocks in which a set of pixels marked 13 to 27 is located) that does not neighbor to the current block.

Figure 6:
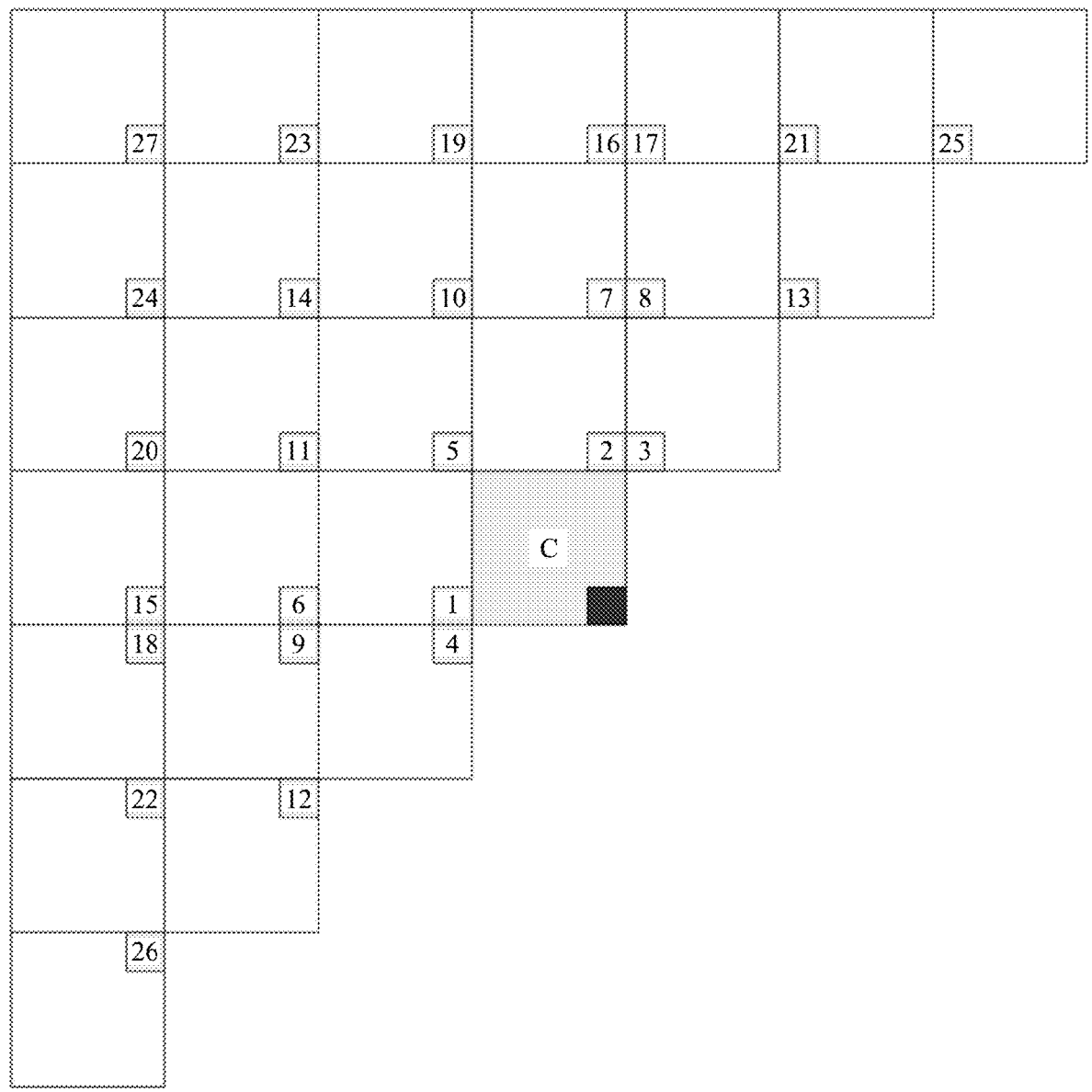
FIG. 6 is a schematic diagram of positions of spatial neighboring (adjacent or non-adjacent) blocks according to an embodiment of this application.

For example, FIG. 6 is an example schematic diagram of the current block and picture blocks, associated with the current block, in non-adjacent positions according to an embodiment of this application. Before the current block is encoded or decoded, reconstruction of the plurality of spatial non-adjacent picture blocks is completed, in other words, intra prediction modes of the plurality of spatial non-adjacent picture blocks have been determined. When any one of the plurality of spatial non-adjacent picture blocks is unavailable, to be specific, when the any one of the plurality of spatial non-adjacent picture blocks is an intra-encoded block, or goes beyond a boundary of picture, a slice, or a tile, or the like, the picture block may be excluded during a subsequent operation. It is clearly that the plurality of spatial non-adjacent picture blocks include picture blocks whose intra prediction modes have been determined and that are not adjacent to the current block, for example, picture blocks in which a set of pixels marked 6 to 27 in FIG. 6 are located. The picture blocks in which the set of pixels marked 1 to 5 in FIG. 6 are located are the spatially adjacent picture blocks described in (1).

In one example implementation, picture blocks in which a set of pixels marked 1 to 27 in FIG. 6 are located do not represent the PU or the CU described above. The following describes an example of FIG. 6 in detail. A large rectangular block marked C is the current block. It is assumed that small rectangles marked 1 to 27 are set as basic pixel units, and the large rectangle has the length of w basic pixel units and the height of h basic pixel units. w and h are both positive integers. A size of a picture block in which each small rectangle is located is the same as a size of the current block. The basic pixel unit may be a sample, may be a 4×4 pixel set, may be a 4×2 pixel set, or may be a pixel set of another size. This is not intended to be limiting. If a virtual coordinate system is created on a picture plane of the current block by using a position, in the picture, of a pixel set basic unit at a bottom-right corner of the current block as an origin, a straight line on which the bottom boundary of the current block is located as a horizontal coordinate axis with a rightward direction as a positive horizontal direction, a straight line on which the right boundary of the current block is located as a vertical coordinate axis with a downward direction as a positive vertical direction, coordinate positions of small rectangles marked 1 to 27 are (−w, 0), (0, −h), (1, −h), (−w, 1), (−w, −h), (−2×w, 0), (0, −2×h), (1, −2×h), (−2×w, 1), (−w, −2×h), (−2×w, −h), (−2×w, h+1), (w+1, −2×h), (−2×w, −2×h), (−3×w, 0), (0, −3×h), (1, −3×h), (−3×w, 1), (−w, −3×h), (−3×w, −h), (w+1, −3×h), (−3×w, h+1), (−2×w, −3×h), (−3×w, −2×h), (2×w+1, −3×h), (−3×w, 2×h+1), and (−3×w, −3×h).

It should be understood that FIG. 6 shows an example feasible implementation of the current block and the picture blocks that are in non-adjacent positions and that are associated with the current block in this embodiment of this application. There may be more than or less than 27 spatial neighboring picture blocks. This is not limited.

For example, the picture in which the current block is located may include at least two rows of coding tree units CTUs, and the size of the current block is not greater than a size of the coding tree unit. A difference between a number of a row (or a number of a column), in the picture, of a coding tree unit in which a picture block whose intra prediction mode has been determined and that is not spatially adjacent to the current block is located and a number of a row (or a number of a column), in the picture, of a coding tree unit in which the current block is located is less than N, where N is an integer greater than 1, for example, N=2.

For example, it is assumed that a length of a CTU is twice w, a height of the CTU is twice h, and the current block C is located at the top-left corner of the CTU. In this case, a difference between a number of a row of the CTU in which picture blocks in which basic pixel units marked 27, 23, 19, 16, 17, 21, and 25 in FIG. 6 are located and whose intra prediction modes have been determined are located and a number of a row of the CTU in which the current block is located is 2. When N is 2, picture blocks in which basic pixel units marked 27, 23, 19, 16, 17, 21, 25, and 26 are located are not spatial non-adjacent picture blocks.

In some implementations, similarly, picture blocks in which basic pixel units marked 24, 20, 25, and 15 are located are spatial non-adjacent picture blocks.

In some implementations, similarly, picture blocks in which basic pixel units marked 18, 22, and 26 are located are not spatial non-adjacent blocks, either.

(3) For ease of description, a picture block whose intra prediction mode has been determined and that neighbors to the current block in time domain is referred to as a temporal neighboring picture block, a picture block whose intra prediction mode has been determined and that temporally neighbors to the current block, or a picture block temporally neighboring to the current block.

Figure 7:
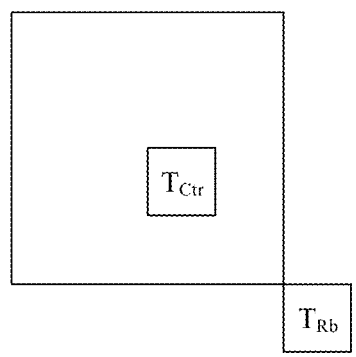
FIG. 7 is a schematic diagram of positions of temporal neighboring blocks according to an embodiment of this application.

FIG. 7 is an example schematic diagram of the current block and a temporal neighboring picture block associated with the current block according to an embodiment of this application.

FIG. 7 shows a spatial neighboring block at the bottom-right corner of a co-located block of the current block and a sub-block in the center of the current block. The sub-block is a basic unit for storing prediction information. The co-located block is a picture block, whose size, shape, and position are all the same as those of the current block, in a reference picture temporally neighboring to the picture in which the current block is located. In FIG. 7, $T_{Gr}$ represents the sub-block in the center, and $T_{Rb}$ represents the spatial neighboring block at the bottom-right corner.

The basic unit for storing the prediction information may be a 4×4 pixel set, may be a 4×8 pixel set, or may be a pixel set of another size. This is not limited.

For example, a sub-block has a size of 4×4 pixel set. It is assumed that the current block has a length of w pixels and a height of h pixels, and coordinates of the top-left corner of the center 4×4 sub-block relative to the top-left corner of the co-located block are ($\lfloor \lfloor W/4 \rfloor/2 \rfloor *4, \lfloor \lfloor H/4 \rfloor/2 \rfloor *4$), where the mathematical symbol $\lfloor \ \rfloor$ represents rounding down. For example, if A=3.9, $\lfloor A \rfloor$=3.

Figure 8:
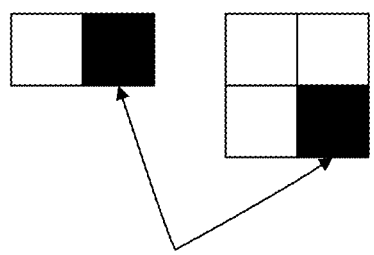
FIG. 8 is a schematic diagram of a sub-block in the center according to an embodiment of this application.

Referring to FIG. 8, if W=8 and H=4, coordinates of the top-left corner of the center 4×4 sub-block relative to the top-left corner of the co-located block are (4, 0). If W=8, and H=8, coordinates of the top-left corner of the center 4×4 sub-block relative to the top-left corner of the co-located block are (4, 4).

During intra prediction of a luma mode, for example, if the foregoing 67 intra modes are used as candidate luma intra prediction modes, the prediction modes may be classified into a set of MPMs, a set of selected modes, and a set of non-selected modes (which may also be referred to as remaining modes), to improve efficiency of finally selecting an intra prediction mode for encoding. Further, it is assumed that the set of MPMs includes six candidate intra prediction modes, the set of selected modes includes 16 candidate intra prediction modes, and the remaining 45 candidate intra prediction modes are remaining modes, that is, belong to the set of non-selected modes. It should be understood that no limitation is imposed on each of a quantity of directional prediction modes, a quantity of non-directional prediction modes, a quantity of prediction modes in the set of MPMs, a quantity of prediction modes in the set of selected modes, and a quantity of prediction modes in the set of non-selected modes.

It should be understood that a set of candidate intra prediction modes in the set of MPMs is a subset of the 67 candidate intra prediction modes.

It should be understood that the candidate intra prediction modes in the set of MPMs are different from each other, and the candidate intra prediction modes in the set of selected modes are different from each other.

Similar to a luma component, during intra mode prediction of a chroma component, a boundary pixel of an neighbouring reconstructed block around a current chroma block is also used as a reference pixel of the current block, the reference pixel is mapped to a sample in the current chroma block based on a specific prediction mode, and the sample is used as a prediction value of a pixel in the current chroma block. A difference lies in that because texture of the chroma component is usually simpler, a quantity of intra prediction modes of the chroma component is usually less than that of the luma component. Among chroma intra prediction modes, there are 11 intra prediction modes for the chroma component, including five conventional chroma intra modes and six cross-component linear model (CCLM) modes.

The chroma intra prediction modes may be classified into three types: a CCLM mode, a derived mode (DM), and a chroma intra prediction mode that is obtained from a spatial neighboring block. In the CCLM mode, a chroma component prediction value of a pixel is calculated based on a correlation model by using a reconstructed value of a luma component of the pixel. A parameter of the correlation model is obtained through calculation based on reconstructed values of luma components and chroma components of reference pixels on the top and the left of the current block. In the DM mode, prediction is performed by using a luma component prediction mode of the current block as a chroma component prediction mode of the current block. The derived mode and the chroma intra prediction mode that is obtained from the spatial neighboring block may be collectively referred to as the set of conventional chroma intra modes.

In addition, it should be understood that in descriptions of this application, terms such as "first" and "second" are merely used for differentiation and description, but cannot be understood as an indication or implication of relative importance or an indication or implication of an order. The term "a plurality of" in the description of this application means two or more than two. In the description of this application, the term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

Figure 9:
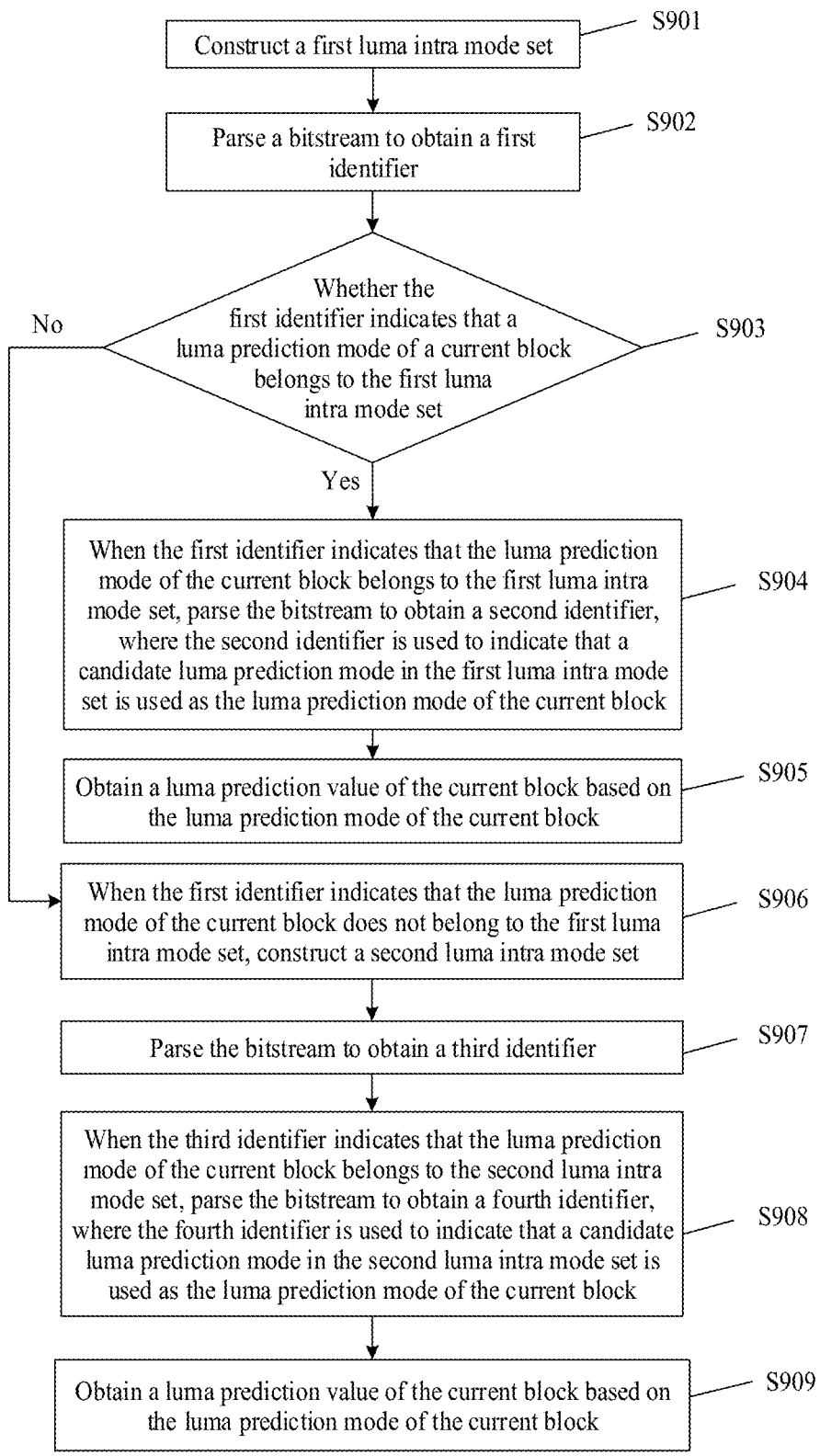
FIG. 9 is a schematic diagram of luma mode prediction in a decoding procedure according to an embodiment of this application.
Figure 10:
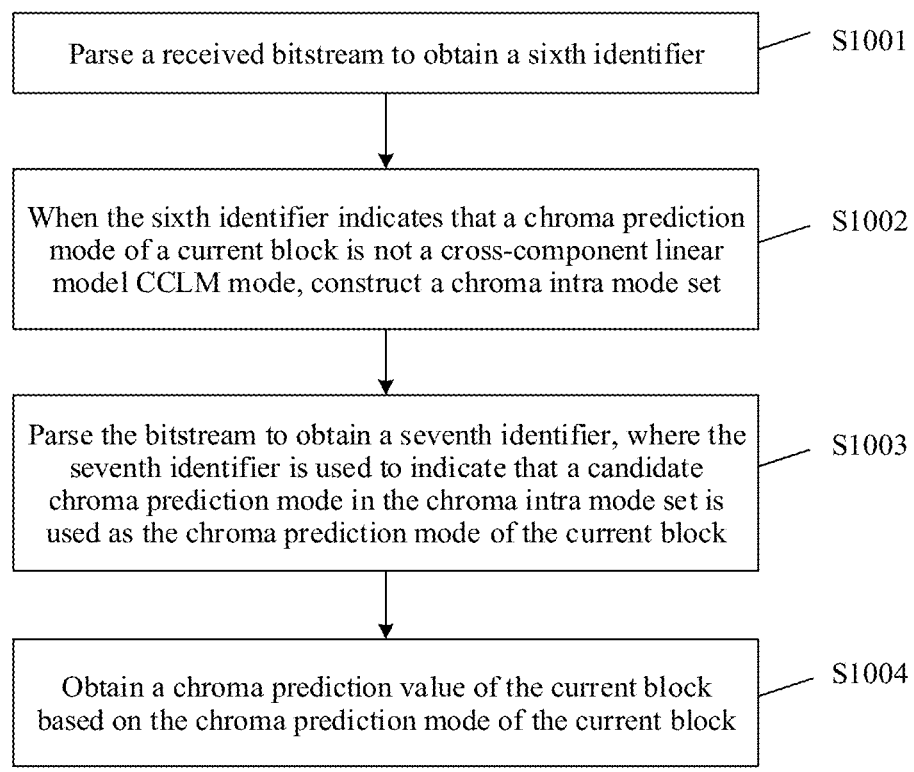
FIG. 10 is a schematic diagram of chroma mode prediction in a decoding procedure according to an embodiment of this application.

FIG. 9 and FIG. 10 are flowcharts of video data decoding methods in one or more feasible implementations described in the embodiments of this application. FIG. 9 is a flowchart of a luma intra prediction method, and FIG. 10 is a flowchart of a chroma intra prediction method.

Specifically, as shown in FIG. 9, the method in this embodiment of this application includes the following steps.

S901. Construct a first luma intra mode set. The first luma intra mode set is a subset of a plurality of preset candidate luma prediction modes.

S902. Parse a bitstream to obtain a first identifier. It should be noted that there is no order between S902 and S901.

The first luma intra mode set may be a set of MPMs. Correspondingly, the first identifier is an identifier used to indicate whether a luma prediction mode, finally selected by an encoder side, of a current block is from the set of MPMs. For example, when the first identifier is "1", it indicates that the luma prediction mode of the current block is from the set of MPMs; and when the first identifier is "0", it indicates that the luma prediction mode of the current block does not belong to the set of MPMs. The first identifier may be MPM_flag.

It should be understood that the set of MPMs may be constructed in a plurality of manners, including determining types of candidate luma prediction modes in the set of MPMs and an arrangement order of the candidate luma prediction modes in the set.

The set of MPMs may include the following candidate luma prediction modes:

(A) a luma prediction modes of spatially adjacent picture block, whose intra prediction mode has been determined, of the current block in (1), which may also be referred to as determined luma prediction mode of the spatially adjacent picture block of the current block;

(B) a luma prediction mode of spatial non-adjacent picture block, whose intra prediction mode has been determined, of the current block in (2), which may also be referred to as determined luma prediction mode of the spatial non-adjacent picture block of the current block;

(C) a luma prediction mode of the temporal neighboring picture block, whose intra prediction mode has been determined, of the current block in (3), which may also be referred to as determined luma prediction mode of the temporal neighboring picture block of the current block;

(D) a preset non-directional prediction mode;

(E) prediction mode in prediction direction neighbouring to those of directional prediction mode obtained based on (1); and (F) default luma prediction mode, where the default luma prediction mode may include directional prediction mode with index numbers {0, 1, 50, 18, 2, 34}.

The non-directional prediction mode in (D) includes a DC mode and/or a planar mode. The candidate luma prediction mode in (E) includes a candidate luma prediction mode represented by an index number whose difference from index number of the candidate luma prediction mode in (A) added to the set of MPMs is 1 (an absolute value of the index difference is 1). For example, the candidate luma prediction mode in (E) may alternatively include candidate luma prediction mode represented by index number whose difference from index number of the candidate luma prediction mode in (A) added to the set of MPMs is 2, 3, or another integer. This is not limited.

It should be understood that in a process of adding different candidate luma prediction modes to the set of MPMs, "pruning" (pruning) needs to be performed, to avoid repeatedly adding a same candidate luma prediction mode to the set of MPMs, and ensure that each index value in the set of MPMs represents only one luma prediction mode.

It should be understood that a capacity of the set of MPMs is preset, to be specific, a quantity of candidate luma prediction modes included in the set of MPMs does not exceed a first preset value. In a process of constructing the set of MPMs, candidate luma prediction modes are sequentially added to the set of MPMs in a predetermined adding order until the first preset value is reached.

In one example implementation, candidate luma prediction modes in the set of MPMs include the candidate luma prediction modes in (A) to (F).

Based on this implementation, a first adding order may be: the candidate luma prediction modes in (A), the preset non-directional candidate luma prediction mode in (D), the candidate luma prediction modes in (C), the candidate luma prediction modes in (B), the candidate luma prediction modes in (E), and the default luma prediction modes in (F). It should be understood that the adding order in this application reflects only a trend, and specific implementation orders may be reversed or crossed. This is not limited.

For example, referring to FIG. 5, the candidate luma prediction modes in (A) and the preset non-directional candidate luma prediction mode in (D) may be added to the set of MPMs in the following order: a luma prediction mode of the picture block (L) on the left of the current block and neighbouring to the bottom-left corner of the current block, a luma prediction mode of the picture block (A) above the current block and neighbouring to the top-left corner of the current block, the planar mode, the DC mode, a luma prediction mode of the picture block (BL) neighbouring to the bottom-left corner of the current block, a luma prediction mode of the picture block (AR) neighbouring to the top-right corner of the current block, and a luma prediction mode of the picture block (AL) neighbouring to the top-left corner of the current block.

For example, referring to FIG. 7 and FIG. 8, the candidate luma prediction modes in (C) may be added to the set of MPMs in the following order: a luma prediction mode of a sub-block in the center of a co-located block and a luma prediction mode of a spatial neighboring block at the bottom-right corner of the co-located block.

For example, the candidate luma prediction modes in (B) may be added to the set of MPMs in ascending order of group numbers of picture blocks whose intra prediction modes have been determined. Referring to FIG. 6, to be specific, the luma prediction modes of the spatial non-adjacent picture blocks are sequentially added to the set of MPMs in order of the first group, the second group, and the third group.

In some embodiments, when at least two picture blocks whose intra prediction modes have been determined and that are not adjacent to the current block have a same group number, luma prediction modes of the at least two picture blocks whose intra prediction modes have been determined and that are not adjacent to the current block may be sequentially added to the set of MPMs in ascending order of distances to an origin from the at least two picture blocks whose intra prediction modes have been determined and that are not adjacent to the current block. The distance is a sum of absolute values of a horizontal coordinate and a vertical coordinate, in a virtual coordinate system, of a pixel set basic unit in a preset position in the picture block whose intra prediction mode has been determined and that is not neighbouring to the current block.

In some embodiments, luma prediction modes of picture blocks whose intra prediction modes have been determined and that are not adjacent to the current block may be sequentially added to the set of MPMs in ascending order of distances to the origin from the picture blocks whose intra prediction modes have been determined and that are not adjacent to the current block. The distance is a sum of absolute values of a horizontal coordinate and a vertical coordinate, in the virtual coordinate system, of a pixel set basic unit in a preset position in the picture block whose intra prediction mode has been determined and that is not neighbouring to the current block.

For example, in a same group, distances from the basic pixel units to a preset basic pixel unit in the current block are compared, and a luma prediction mode of a picture block in which a basic pixel unit closer to the preset basic pixel unit is located is added preferentially. It is assumed that the preset basic pixel unit in the current block is located at the bottom-right corner of the picture block, that is, the origin position of the virtual coordinate system. Obtaining motion information in the second group includes the following steps.

(1) A distance from each basic pixel unit to the origin position is calculated, where a distance calculation manner is to calculate a sum of absolute values of a horizontal coordinate and a vertical coordinate of each basic pixel unit to the origin position. It should be understood that when the preset basic pixel unit is not the origin, the distance calculation manner is to calculate a sum of an absolute value of a difference between horizontal coordinates of each basic pixel unit and the preset basic pixel unit and an absolute value of a difference between vertical coordinates of the basic pixel unit and the preset basic pixel unit.

A distance D13 between the origin and a basic pixel unit marked 13 is w+1+2×h. Similarly, D8 is 1+2×h, D7 is 2×h, D10 is w+2×h, D14 is 2×w+2×h, D11 is 2×w+h, D9 is 2×w, D6 is 2×w+1, and D12 is 2×w+h+1. It is assumed that w is equal to h. In this case, D13 is 3×h+1, D8 is 2×h+1, D7 is 2×h, D10 is 3×h, D14 is 4×h, D11 is 3×h, D9 is 2×h, D6 is 2×h+1, and D12 is 3×h+1.

(2) Luma prediction modes of spatial non-neighboring picture blocks are sequentially added to the list of MPMs in ascending order of distances. When the distances are the same, the luma prediction modes of the spatially non-neighboring picture blocks are sequentially added to the list of MPMs according to a prediction rule (for example, from left to right, from top to bottom, where the order is not limited provided that the order on an encoder side is consistent with that on a decoder side).

For example, luma prediction modes of picture blocks in the second group may be added in order of luma prediction modes of picture blocks in which basic pixel units marked 6, 7, 8, 9, 10, 11, 12, 13, and 14 are located.

For example, as shown in FIG. 6, for the candidate luma prediction modes in (B), luma prediction modes of picture blocks in which basic pixel units marked 6, 7, 8, 9, 10, 11, 12, 13, 14, 15, 16, 17, 18, 19, 20, 21, 22, 23, 24, 25, 26, and 27 are located may be sequentially added to the set of MPMs in order of the picture blocks in which the basic pixel units marked 6 to 27 are located.

For example, an order of adding the candidate luma prediction modes in (B) may be a predetermined descending order of accuracy of performing prediction based on the luma prediction modes of all the spatially non-adjacent picture blocks. The prediction accuracy may be obtained through statistics collection within a historical duration.

In one embodiment corresponding to a first possible adding order described above, referring to FIG. 5 to FIG. 7, the luma prediction modes of the corresponding picture blocks are sequentially added to the set of MPMs in order of L→A→planar→DC→BL→AR→AL. If the set of MPMs is not fully filled, to be specific, the quantity of candidate luma prediction modes does not reach the first preset value, the luma prediction mode of the sub-block in the center of the co-located block and the luma prediction mode of the spatial neighboring picture block at the bottom-right corner of the co-located block are sequentially added to the set of MPMs. In this case, if the set of MPMs is not fully filled yet, the luma prediction modes of the picture blocks marked 6 to 27 are sequentially added to the set of MPMs; if the set of MPMs is not fully filled yet, neighbouring directional prediction modes of the directional prediction modes in the current set of MPMs are sequentially added; and if the set of MPMs is not fully filled yet, the default luma prediction modes {planar, DC, VER (vertical mode), HOR (horizontal mode), luma prediction mode corresponding to the index 2, luma prediction mode corresponding to the index 34} are sequentially added.

Based on the first implementation described above, another adding order may be: the candidate luma prediction modes in (A), the preset non-directional candidate luma prediction mode in (D), the candidate luma prediction modes in (B), the candidate luma prediction modes in (C), the candidate luma prediction modes in (E), and the default luma prediction modes in (F).

A difference between the two adding orders lies in that the adding order of the candidate luma prediction modes in (B) and the adding order of the candidate luma prediction modes in (C) are reversed. To be specific, in the first possible adding order, luma prediction modes of temporal neighboring picture blocks are preferentially added to the set of MPMs, and luma prediction modes of spatial non-adjacent picture blocks are added to the set of MPMs when the set of MPMs is not fully filled. In the second adding order, luma prediction modes of spatial non-adjacent picture blocks are preferentially added to the set of MPMs, and luma prediction modes of temporal neighboring picture blocks are added to the set of MPMs when the set of MPMs is not fully filled.

In a second implementation, candidate luma prediction modes in the set of MPMs include the candidate luma prediction modes in (A), (B), (D), (E), and (F). A difference between the second possible implementation and the first possible implementation lies in that the luma prediction modes of the temporal neighboring picture blocks in (C) are not included in the second possible implementation. For repeated content between the second possible implementation and the first possible implementation, details are not described herein again.

Based on the second implementation, another adding order may be: the candidate luma prediction modes in (A), the preset non-directional candidate luma prediction mode in (D), the candidate luma prediction modes in (B), the candidate luma prediction modes in (E), and the default luma prediction modes in (F). For an example order of (A), (D), (B), (E), and (F), refer to the first possible implementation. Details are not described herein again.

In a third implementation, the candidate luma prediction modes in the set of MPMs include the candidate luma prediction modes in (A), (C), (D), (E), and (F). A difference between the third implementation and the first implementation lies in that the luma prediction modes of the spatial non-adjacent picture blocks in (B) are not included in the third possible implementation.

Based on the third implementation, another adding order may be: the candidate luma prediction modes in (A), the preset non-directional candidate luma prediction mode in (D), the candidate luma prediction modes in (C), the candidate luma prediction modes in (E), and the default luma prediction modes in (F). For a specific order of (A), (D), (C), (E), and (F), refer to the first possible implementation. Details are not described herein again.

S903. Determine whether the luma prediction mode, indicated by the first identifier, of the current block belongs to the first luma intra mode set. If the luma prediction mode, indicated by the first identifier, of the current block belongs to the first luma intra mode set, perform S904; or if the luma prediction mode, indicated by the first identifier, of the current block does not belong to the first luma intra mode set, perform S906.

S904. Parse the bitstream to obtain a second identifier when the first identifier indicates that the luma prediction mode of the current block belongs to the first luma intra mode set, where the second identifier is used to indicate that a candidate luma prediction mode in the first luma intra mode set is used as the luma prediction mode of the current block, and the second identifier may be MPM mode_flag.

That is, the candidate luma prediction mode indicated by the second identifier is used as the luma prediction mode of the current block.

In one example implementation, a unary code (Unary code) is used for the second identifier. When an arrangement order of the candidate luma prediction mode indicated by the second identifier ranks higher in the first mode set, a length of a codeword of the second identifier is shorter.

For example, in a manner shown in the following Table 1, different codewords may be assigned to second identifiers representing different luma prediction modes.

TABLE 1

| Luma prediction mode | Codeword of a second identifier |
|---|---|
| Index A | 0 |
| Index B | 10 |
| Planar | 110 |
| DC | 1110 |
| Index C | 11110 |
| Index D | 11111 |

S905. Obtain a luma prediction value of the current block based on the luma prediction mode of the current block.

S906. Construct a second luma intra mode set when the first identifier indicates that the luma prediction mode of the current block does not belong to the first luma intra mode set.

S907. Parse the bitstream to obtain a third identifier. The third identifier may be selected_flag.

The second luma intra mode set may be a set of selected modes. Correspondingly, the third identifier is a flag used to identify whether the luma prediction mode, finally selected by the encoder side, of the current block is from the set of selected modes. For example, when the third identifier is "1", it indicates that the intra prediction mode of the current block is from the set of selected modes; and when the third identifier is "0", it indicates that the intra prediction mode of the current block does not belong to the set of selected modes.

The second luma intra mode set is a subset of the plurality of preset candidate luma prediction modes, and there is no intersection between the second luma intra mode set and the first luma intra mode set.

In a fourth implementation, candidate luma prediction modes in the set of selected modes include directional prediction modes that are obtained by sampling (B), (C), and (G) at a preset direction interval. Specifically, for example, the candidate luma intra prediction modes in the set of selected modes may include intra prediction modes that are not included in the set of MPMs and whose index numbers are {0, 4, 8, 12 . . . 60}. The preset direction interval may be 4, or certainly may be another value, for example, 2 or 3.

In a process of adding a candidate luma prediction mode to the set of selected modes, the candidate luma prediction mode needs to be selected from candidate luma prediction modes other than the candidate luma prediction modes included in the set of MPMs.

Based on the fourth implementation, another adding order may be: the candidate luma prediction modes in (C), the candidate luma prediction modes in (B), and the candidate luma prediction modes in (G). For an adding order of the candidate luma prediction modes in (C) and an order of the candidate luma prediction modes in (B), refer to the description in the first possible implementation. Details are not described herein again.

Based on the fourth implementation, another adding order may be: the candidate luma prediction modes in (B), the candidate luma prediction modes in (C), and the candidate luma prediction modes in (G). A difference between the sixth possible adding order and the fifth possible adding order lies in that the adding order of the candidate luma prediction modes in (B) and the adding order of the candidate luma prediction modes in (C) are reversed. For example, in this adding order, the luma prediction modes (C) of the temporal neighboring picture blocks are preferentially added to the set of selected modes, and the luma prediction modes (B) of the spatial non-adjacent picture blocks are added to the set of selected modes when the set of selected modes is not fully filled. However, in this adding order, the luma prediction modes (B) of the spatial non-adjacent picture blocks are preferentially added to the set of selected modes, and the luma prediction modes (C) of the temporal neighboring picture blocks are added to the set of selected modes when the set of MPMs is not fully filled.

It should be noted that if the set of MPMs is fully filled after the candidate luma prediction modes in (B) and the candidate luma prediction modes in (C) are added, the candidate luma prediction modes in (B) and the candidate luma prediction modes in (C) are not considered when the set of selected modes is constructed.

In a fifth implementation, candidate luma prediction modes in the set of selected modes include the candidate luma prediction modes in (C) and the directional prediction modes in (G) that are obtained by performing sampling at a preset direction interval. A difference between the fifth implementation and the fourth implementation lies in that the luma prediction modes of the spatial non-adjacent picture blocks in (B) are not included in the fifth possible implementation.

Based on the fifth implementation, another adding order may be: the candidate luma prediction modes in (C) and the candidate luma prediction modes in (G).

In a sixth implementation, candidate luma prediction modes in the set of selected modes include the candidate luma prediction modes in (B) and the directional prediction modes in (G) that are obtained by performing sampling at a preset direction interval. A difference between this implementation and the fourth implementation lies in that the luma prediction modes of the spatial non-adjacent picture blocks in (C) are not included in the fifth possible implementation.

Based on the sixth implementation, another adding order may be: the candidate luma prediction modes in (B) and the candidate luma prediction modes in (G).

In a seventh implementation, candidate luma prediction modes in the set of MPMs do not include the candidate luma prediction modes in (B) and/or the candidate luma prediction modes in (C), and candidate luma prediction modes in the set of selected modes include the candidate luma prediction modes in (B) and/or the candidate luma prediction modes in (C).

In an eighth implementation, candidate luma prediction modes in the set of MPMs include the candidate luma prediction modes in (B) and/or the candidate luma prediction modes in (C), and candidate luma prediction modes in the set of selected modes do not include the candidate luma prediction modes in (B) and/or the candidate luma prediction modes in (C).

It should be understood that the fourth to the eighth implementations provide, as examples, several independent implementations of constructing the set of selected modes. When any possible implementation cannot make the candidate intra prediction modes in the set of selected modes reach a second preset value, the set of selected modes may be constructed in combination with an implementation method in another possible implementation. An independent implementation is not limited thereto, and a manner of combining different implementations is not limited.

It should be understood that the fourth to the sixth possible implementations of constructing the set of selected modes and the first to the third possible implementations of constructing the set of MPMs may be combined in any manner. This is not limited.

S908. When the third identifier indicates that the luma prediction mode of the current block belongs to the second luma intra mode set, parse the bitstream to obtain a fourth identifier, where the fourth identifier is used to indicate that a candidate luma prediction mode in the second luma intra mode set is used as the luma prediction mode of the current block. The fourth identifier may be selected mode_flag. That is, the candidate luma prediction mode indicated by the fourth identifier is used as the luma prediction mode of the current block.

In one example implementation, a fixed-length code is used for the fourth identifier. Specifically, when there are 16 candidate luma prediction modes in the set of selected modes, each candidate luma prediction mode in the set of selected modes is coded by using a 4-bit fixed-length codeword.

S909. Obtain a luma prediction value of the current block based on the luma prediction mode of the current block.

In one example implementation, when the third identifier indicates that the luma prediction mode of the current block does not belong to the second luma intra mode set, the bitstream is parsed to obtain a fifth identifier. The fifth identifier is used to indicate a candidate luma prediction mode, used as the luma prediction mode of the current block, in candidate luma prediction modes in the plurality of preset candidate luma prediction modes other than the first luma intra mode set and the second luma intra mode set.

That is, the candidate luma prediction mode indicated by the fifth identifier is used as the luma prediction mode of the current block. The candidate luma prediction modes in the plurality of preset candidate luma prediction modes other than the first luma intra mode set and the second luma intra mode set are referred to as candidate luma prediction modes in a set of non-selected modes in some embodiments, and are referred to as remaining candidate luma prediction modes (remaining modes) in some other embodiments. This is not limited.

In one example implementation, a truncated binary code (truncated binary code) is used for the fifth identifier.

In one example implementation solution, a set of 67 preset candidate luma prediction modes is classified into six candidate luma prediction modes belonging to the set of MPMs, 16 candidate luma prediction modes belonging to the set of selected modes, and remaining candidate luma prediction modes belonging to the set of non-selected modes. The following steps are performed.

1001. Obtain MPM_flag through decoding. If MPM_flag is 1, it indicates that the luma prediction mode of the current block is an MPM mode, and the luma prediction mode is derived based on an MPM mode index (MPM mode_flag) obtained through decoding and a list of MPMs. A decoding mode based on a unary code is used for the MPM mode index. A process of constructing the list of MPMs is as follows (referring to a position relationship between blocks in FIG. 6). The following order is merely an example, and is not specifically limited.

1. If an L block exists and is coded with an intra prediction mode, add a luma prediction mode of the L block to the list of MPMs.

2. If an A block exists and is coded with an intra prediction mode, and a luma prediction mode of the A block is not added to the list of MPMs, add the luma prediction mode of the A block to the list of MPMs.

3. If a planar mode is not added to the list of MPMs, add the planar mode to the list of MPMs.

4. If a DC mode is not added to the list of MPMs, add the DC mode to the list of MPMs.

5. If a BL block exists and is coded with an intra prediction mode, and a luma prediction mode of the BL block is not added to the list of MPMs, add the luma prediction mode of the BL block to the list of MPMs.

6. If an AR block exists and is coded with an intra prediction mode, and a luma prediction mode of the AR block is not added to the list of MPMs, add the luma prediction mode of the AR block to the list of MPMs.

7. If there are less than six prediction modes in the list of MPMs, an AL block exists and is coded with an intra prediction mode, and a luma prediction mode of the AL block is not added to the list of MPMs, add the luma prediction mode of the AL block to the list of MPMs.

8. If there are less than six prediction modes in the list of MPMs, sequentially add luma prediction modes of the picture blocks marked 6 to 27 in FIG. 6 to the list of MPMs, and ensure that a to-be-added luma prediction mode does not exist in the list of MPMs. If a quantity of modes in the list of MPMs is up to 6, the adding stops.

In some embodiments, step 8 may alternatively be replaced in the following manner:

If there are less than six prediction modes in the list of MPMs, the luma prediction modes of the picture blocks marked 6 to 27 in FIG. 6, the luma prediction mode of the sub-block in the center of the co-located block in FIG. 7 or FIG. 8, and the luma prediction mode of the spatial neighboring block at the bottom-right corner of the co-located block in FIG. 7 or FIG. 8 are sequentially added to the list of MPMs, and it is ensured that a to-be-added luma prediction mode does not exist in the list of MPMs; and if a quantity of modes in the list of MPMs is up to 6, the adding stops.

9. If there are less than six prediction modes in the list of MPMs, sequentially add neighbouring angle prediction modes, that is, angle_mode−1 and angle_mode+1, of an angle prediction mode (a mode angle_mode other than the planar mode and the DC mode) in the list of MPMs to the list of MPMs in order of modes that have been added to the existing list of MPMs. As shown in FIG. 6, when the angle_mode is 2, angle_mode−1 corresponds to an adding mode 66; and when the angle_mode is 66, angle_mode+1 corresponds to an adding mode 2. If the quantity of modes in the list of MPMs is up to 6, the adding stops. The angle prediction mode may be referred to as a directional prediction mode.

10. If there are less than six prediction modes in the list of MPMs, sequentially add modes in a default mode list that are not added: {Planar, DC, Ver (vertical mode), Hor (horizontal mode), 2, DIA (diagonal mode 34, that is, oblique 45-degree mode)}.

1002. If MPM_flag is 0, decode selected_flag. If selected_flag is 1, it indicates that a prediction mode currently selected for decoding is a selected mode; and obtain an index of the selected mode (selected mode_flag) through decoding, and then derive the luma prediction mode based on a constructed list of selected modes, where a decoding mode based on a 4-bit fixed-length code is used for the index of the selected mode, and a process of constructing the list of selected modes is as follows:

1. Sequentially add the luma prediction modes of the picture blocks marked 6 to 27 in FIG. 6 to the list of selected modes, and ensure that a to-be-added luma prediction mode does not exist in the list of selected modes; and if a quantity of modes in the list of selected modes is up to 6, the adding stops.

In some embodiments, step 1 may alternatively be replaced in the following manner:

The luma prediction modes of the picture blocks marked 6 to 27 in FIG. 6, the luma prediction mode of the sub-block in the center of the co-located block in FIG. 7 or FIG. 8, and the luma prediction mode of the spatial neighboring block at the bottom-right corner of the co-located block are sequentially added to the list of selected modes, and it is ensured that a to-be-added luma prediction mode exists in neither the list of selected modes nor the list of MPMs; and if a quantity of modes in the list of selected modes is up to 16, the adding stops.

2. Sequentially add neighbouring angle prediction modes of an angle mode to the list of selected modes in order of the angle prediction modes in the list of MPMs. An angle interval is a multiple of 2. For example, if an angle interval for first adding is 2, the neighbouring angle prediction modes are angle_mode−2 and angle_mode+2. If there are still less than 16 selected modes in the set of selected modes after all angle modes in the list of MPMs are traversed, neighbouring angle modes with an angle interval of 4 continue to be added. By analogy, an angle interval is gradually increased until 16 modes are selected. In the adding process, it needs to be ensured that a to-be-added angle mode is not added and is not a mode in the list of MPMs. In the adding process, neighbouring angles of an angle mode circulate based on 65 modes, that is, a mode 2 and a mode 66 are neighbouring angle modes. It should be understood that the angle interval may alternatively be a multiple of 1, a multiple of 3, or the like. This is not limited, provided that the angle interval is consistent with that agreed on by the encoder side in advance in a protocol.

1003. If selected_flag is 0, it indicates that a luma prediction mode currently selected for decoding is a mode in the list of non-selected modes; and obtain a mode index through decoding, and derive a prediction mode, where an index of the non-selected mode may be represented by a truncated binary code (truncated binary code).

Referring to FIG. 10, an embodiment of this application provides another method. The method includes the following steps.

S1001. Parse a received bitstream to obtain a sixth identifier.

S1002. Construct a chroma intra mode set when the sixth identifier indicates that a chroma prediction mode of a current block is not a cross-component linear model CCLM mode.

S1003. Parse the bitstream to obtain a seventh identifier, where the seventh identifier is used to indicate that a candidate chroma prediction mode in the chroma intra mode set is used as the chroma prediction mode of the current block.

In this embodiment of this application, the chroma intra mode set may be a set of conventional chroma intra modes. Correspondingly, the sixth identifier is an identifier used to indicate whether the chroma prediction mode, finally selected by an encoder side, of the current block is from a set of MPMs. For example, when the sixth identifier is "1", it indicates that the chroma prediction mode of the current block is not the CCLM mode, that is, the chroma prediction mode of the current block is from the set of conventional chroma intra modes; and when the sixth identifier is "0", it indicates that the chroma prediction mode of the current block is the CCLM mode, but does not belong to the set of conventional chroma intra modes.

It should be understood that the set of conventional chroma intra modes is constructed in a plurality of manners, including determining types of candidate chroma prediction modes in the set of conventional chroma intra modes and an arrangement order of the candidate chroma prediction modes in the set.

The set of conventional chroma intra modes may include candidate chroma prediction modes:

(H) chroma prediction modes of spatially adjacent picture blocks, whose intra prediction modes have been determined, of the current block in (1);

(I) chroma prediction modes of spatial non-adjacent picture blocks, whose intra prediction modes have been determined, of the current block in (2);

(J) chroma prediction modes of temporal neighboring picture blocks, whose intra prediction modes have been determined, of the current block in (3);

(K) a preset non-directional prediction mode;

(L) prediction modes in prediction directions neighbouring to those of directional prediction modes obtained based on (1);

(M) default chroma prediction modes, where the default chroma prediction modes may include directional prediction modes with index numbers {50, 18, 2}; and (N) a DM mode (a luma prediction mode of the current block).

The non-directional prediction mode (K) includes a DC mode and/or a planar mode. The candidate chroma prediction mode in (L) includes a candidate chroma prediction mode represented by an index number whose difference from index number of the candidate chroma prediction mode in (H) added to the set of MPMs is 1 (an absolute value of the index difference is 1). For example, the candidate chroma prediction mode in (L) may alternatively include candidate chroma prediction mode represented by index number whose difference from index number of the candidate chroma prediction mode in (H) added to the set of MPMs is 2, 3, or another integer. This is not limited.

It should be understood that in a process of adding different candidate chroma prediction modes to the set of conventional chroma intra modes, "pruning" (pruning) needs to be performed, to avoid repeatedly adding a same candidate chroma prediction mode to the set of conventional chroma intra modes, and ensure that each index value in the set of conventional chroma intra modes represents only one chroma prediction mode.

It should be understood that a capacity of the set of conventional chroma intra modes is preset, to be specific, a quantity of candidate chroma prediction modes included in the set of conventional chroma intra modes does not exceed a first preset value. In a process of constructing the set of conventional chroma intra modes, candidate chroma prediction modes are sequentially added to the set of conventional chroma intra modes in a predetermined adding order until a third preset value is reached.

In a ninth implementation, the candidate chroma prediction modes in the set of conventional chroma intra modes include the candidate chroma prediction modes in (H) to (M).

Based on the ninth possible implementation, a ninth possible adding order is: the candidate chroma prediction modes in (N), the candidate chroma prediction modes in (H), the candidate chroma prediction modes in (J), the candidate chroma prediction modes in (I), the candidate chroma prediction modes in (K), the candidate chroma prediction modes in (L), and the default chroma prediction modes in (M). It should be understood that the adding order in this application reflects only a trend, and specific implementation orders may be reversed or crossed. This is not limited.

For example, referring to FIG. 7 and FIG. 8, the candidate chroma prediction modes in (J) may be added to the set of conventional chroma intra modes in the following order: a chroma prediction mode of a sub-block in the center of a co-located block and a chroma prediction mode of a spatial neighboring block at the bottom-right corner of the co-located block.

For example, the candidate chroma prediction modes in (I) may be added to the set of conventional chroma intra modes in ascending order of group numbers of picture blocks whose intra prediction modes have been determined. Referring to FIG. 6, to be specific, the chroma prediction modes of the spatial non-adjacent picture blocks are sequentially added to the set of conventional chroma intra modes in order of the first group, the second group, and the third group.

In some embodiments, when at least two picture blocks whose intra prediction modes have been determined and that are not adjacent to the current block have a same group number, chroma prediction modes of the at least two picture blocks whose intra prediction modes have been determined and that are not adjacent to the current block may be sequentially added to the set of conventional chroma intra modes in ascending order of distances to an origin from the at least two picture blocks whose intra prediction modes have been determined and that are not adjacent to the current block. The distance is a sum of absolute values of a horizontal coordinate and a vertical coordinate, in a virtual coordinate system, of a pixel set basic unit in a preset position in the picture block whose intra prediction mode has been determined and that is not neighbouring to the current block.

For example, in a same group, distances from the basic pixel units to a preset basic pixel unit in the current block are compared, and a chroma prediction mode of a picture block in which a basic pixel unit closer to the preset basic pixel unit is located is added preferentially. For a specific calculation manner, refer to the description in the first possible implementation. Details are not described herein again.

For example, chroma prediction modes of picture blocks in the second group may be added in order of chroma prediction modes of picture blocks in which basic pixel units marked 6, 7, 8, 9, 10, 11, 12, 13, and 14 are located.

For example, as shown in FIG. 6, for the candidate chroma prediction modes in (I), chroma prediction modes of picture blocks in which basic pixel units marked 6, 7, 8, 9, 10, 11, 12, 13, 14, 15, 16, 17, 18, 19, 20, 21, 22, 23, 24, 25, 26, and 27 are located may be sequentially added to the set of conventional chroma intra modes in order of the picture blocks in which the basic pixel units marked 6 to 27 are located.

In an example embodiment corresponding to an adding order, referring to FIG. 5 to FIG. 7, the chroma prediction modes of the corresponding picture blocks are sequentially added to the set of conventional chroma intra modes in order of L→A→BL→AR→AL. If the set of conventional chroma intra modes is not fully filled, to be specific, the quantity of candidate chroma prediction modes does not reach the third preset value, the chroma prediction mode of the sub-block in the center of the co-located block and the chroma prediction mode of the spatial neighboring picture block at the bottom-right corner of the co-located block are sequentially added to the set of conventional chroma intra modes. In this case, if the set of conventional chroma intra modes is not fully filled yet, the chroma prediction modes of the picture blocks marked 6 to 27 are sequentially added to the set of conventional chroma intra modes; if the set of conventional chroma intra modes is not fully filled yet, the planar mode and the DC mode are sequentially added to the set of conventional chroma intra modes; if the set of conventional chroma intra modes is not fully filled yet, neighbouring directional prediction modes of the directional prediction modes in the current set of conventional chroma intra modes are sequentially added; and if the set of conventional chroma intra modes is not fully filled yet, the default chroma prediction modes {VER (vertical mode), HOR (horizontal mode), chroma prediction mode corresponding to the index 2} are sequentially added.

Based on the ninth possible implementation, a tenth possible adding order is: the candidate chroma prediction modes in (N), the candidate chroma prediction modes in (H), the candidate chroma prediction modes in (I), the candidate chroma prediction modes in (J), the candidate chroma prediction modes in (K), the candidate chroma prediction modes in (L), and the default chroma prediction modes in (M).

A difference between the tenth adding order and the ninth adding order is that the adding order of the candidate chroma prediction modes in (I) and the adding order of the candidate chroma prediction modes in (J) are reversed. For example, in a first possible adding order, chroma prediction modes of temporal neighboring picture blocks are preferentially added to the set of conventional chroma intra modes; and chroma prediction modes of spatial non-adjacent picture blocks are added to the set of conventional chroma intra modes when the set of conventional chroma intra modes is not fully filled. In a second possible adding order, chroma prediction modes of spatial non-adjacent picture blocks are preferentially added to the set of conventional chroma intra modes, and chroma prediction modes of temporal neighboring picture blocks are added to the set of conventional chroma intra modes when the set of conventional chroma intra modes is not fully filled.

In a tenth implementation, the candidate chroma prediction modes in the set of conventional chroma intra modes include the candidate chroma prediction modes in (N), (H), (I), (K), (L), and (M). A difference between the tenth implementation and the ninth implementation lies in that the chroma prediction modes of the temporal neighboring picture blocks in (J) are not included in the tenth possible implementation. For repeated content between the tenth possible implementation and the ninth possible implementation, details are not described herein again.

Based on the tenth implementation, another adding order includes: the candidate chroma prediction modes in (N), the candidate chroma prediction modes in (H), the candidate chroma prediction modes in (I), the candidate chroma prediction mode in (K), the candidate chroma prediction modes in (L), and the default chroma prediction modes in (M). For a specific order of (N), (H), and (I), refer to the ninth possible implementation. Details are not described herein again.

In an eleventh implementation, the candidate chroma prediction modes in the set of conventional chroma intra modes include the candidate chroma prediction modes in (N), (H), (J), (K), (L), and (M). A difference between the eleventh possible implementation and the ninth possible implementation lies in that the chroma prediction modes of the spatial non-adjacent picture blocks in (I) are not included in the eleventh possible implementation.

Based on the eleventh implementation, another adding order may be: the candidate chroma prediction modes in (N), the candidate chroma prediction modes in (H), the candidate chroma prediction modes in (J), the candidate chroma prediction modes in (K), the candidate chroma prediction modes in (L), and the default chroma prediction modes in (M). For a specific order of (N), (H), and (J), refer to the ninth possible implementation. Details are not described herein again.

It should be understood that the fourth to the sixth possible implementations of constructing the set of selected modes, the first to the third possible implementations of constructing the set of MPMs, and the ninth to the eleventh possible implementations of constructing the set of conventional chroma intra modes may be combined in any manner. This is not limited.

S1004. Obtain a chroma prediction value of the current block based on the chroma prediction mode of the current block.

In one example implementation solution, 11 preset candidate chroma prediction modes are classified into five conventional chroma intra prediction modes and six CCLM modes, and the following step is performed:

A flag is obtained through decoding. If the flag is 0, it indicates that the chroma prediction mode of the current block is not a CCLM mode, but is a conventional chroma intra mode. The chroma prediction mode is derived based on an index (flag) through decoding and a list of conventional chroma intra modes. A process of constructing the list of conventional chroma intra modes is as follows (referring to a position relationship between blocks in FIG. 6). The following order is merely an example, and is not specifically limited.

1. Add the DM mode to the set of conventional chroma intra modes.

2. If an L block exists and is coded with an intra prediction mode, add a chroma prediction mode of the L block to the list of conventional chroma intra modes.

3. If an A block exists and is coded with an intra prediction mode, and a chroma prediction mode of the A block is not added to the list of conventional chroma intra modes, add the chroma prediction mode of the A block to the list of conventional chroma intra modes.

4. If a BL block exists and is coded with an intra prediction mode, and a chroma prediction mode of the BL block is not added to the list of conventional chroma intra modes, add the chroma prediction mode of the BL block to the list of conventional chroma intra modes.

5. If an AR block exists and is coded with an intra prediction mode, and the chroma prediction mode of the AR block is not added to the list of conventional chroma intra modes, add the chroma prediction mode of the AR block to the list of conventional chroma intra modes.

6. If there are less than five prediction modes in the list of conventional chroma intra modes, an AL block exists and is coded with an intra prediction mode, and a chroma prediction mode of the AL block is not added to the list of conventional chroma intra modes, add the chroma prediction mode of the AL block to the list of conventional chroma intra modes.

7. If there are less than five prediction modes in the list of conventional chroma intra modes, sequentially add chroma prediction modes of the picture blocks marked 6 to 27 in FIG. 6 to the list of conventional chroma intra modes, and ensure that a to-be-added chroma prediction mode does not exist in the list of conventional chroma intra modes. If a quantity of modes in the list of conventional chroma intra modes is up to 5, the adding stops.

In some embodiments, step 7 may be replaced in the following manner:

If there are less than five prediction modes in the List of conventional chroma intra modes, the chroma prediction modes of the picture blocks marked 6 to 27 in FIG. 6, the chroma prediction mode of the sub-block in the center of the co-located block in FIG. 7 or FIG. 8, and the chroma prediction mode of the spatial neighboring block at the bottom-right corner of the co-located block in FIG. 7 or FIG. 8 are sequentially added to the list of conventional chroma intra modes, and it is ensured that a to-be-added chroma prediction mode does not exist in the list of conventional chroma intra modes; and If a quantity of modes in the list of conventional chroma intra modes is up to 5, the adding stops.

8. If there are less than five prediction modes in the list of conventional chroma intra modes, sequentially add neighbouring angle prediction modes, that is, angle_mode−1 and angle_mode+1, of an angle prediction mode (a mode angle_mode other than the planar mode and the DC mode) modes to the list of conventional chroma intra modes in order of modes that have been added to the list of conventional chroma intra modes. As shown in FIG. 6, when the angle mode is 2, angle_mode−1 corresponds to an adding mode 66; and when the angle_mode is 66, angle_mode+1 corresponds to an adding mode 2. If the quantity of modes in the list of conventional chroma intra modes is up to 5, the adding stops.

9. If there are less than five prediction modes in the list of conventional chroma intra modes, sequentially add modes in a default mode list that are not added: {Ver (vertical mode), Hor (horizontal mode), 2}.

Based on a same inventive concept as the method embodiments, an embodiment of this application further provides an apparatus 1100. The apparatus 1100 may be specifically a processor, a chip, or a chip system in a video encoder, or a module in a video encoder, for example, an intra prediction module 212; or may be a processor, a chip, or a chip system in a video decoder, or a module in a video decoder, for example, an intra prediction module 321. For example, the apparatus may include a receiving unit 1101, a construction unit 1102, a parsing unit 1103, and a calculation unit 1104. The receiving unit 1101, the construction unit 1102, the parsing unit 1103, and the calculation unit 1104 are configured to perform the steps in the methods in the embodiments corresponding to FIG. 9 and FIG. 10. For example, the receiving unit 1101 may be configured to receive a bitstream; the construction unit 1102 is configured to construct a first luma intra mode set, a second luma intra mode set, and a chroma intra mode set; and the parsing unit 1103 is configured to parse the bitstream to obtain an identifier, for example, parse the bitstream to obtain a first identifier to a seventh identifier. The calculation unit 1104 is configured to obtain a luma prediction value and a chroma prediction value.

Figure 11:
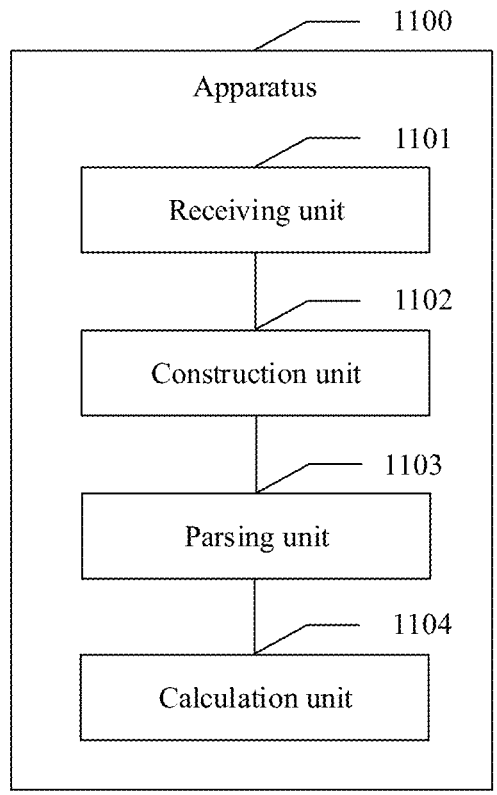
FIG. 11 is a schematic structural diagram of an apparatus 1100 according to an embodiment of this application.
Figure 12:
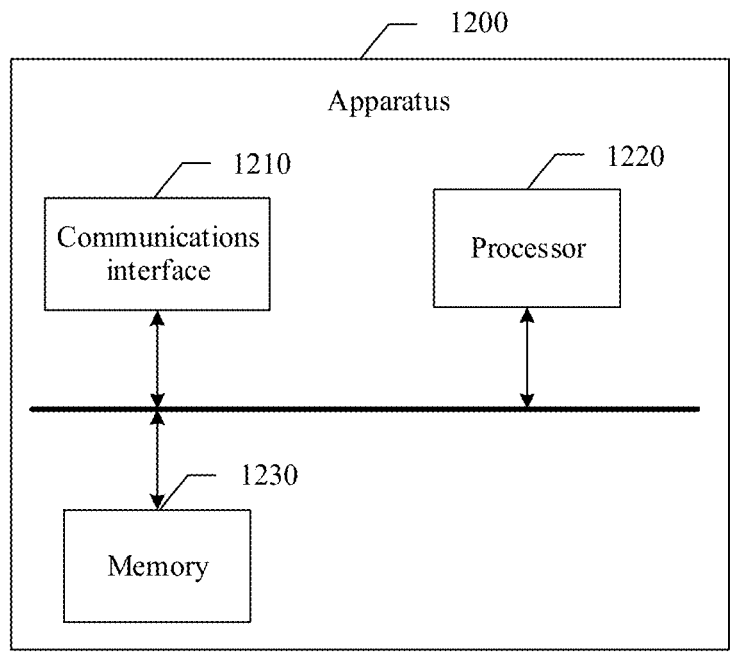
FIG. 12 is a schematic structural diagram of an apparatus 1200 according to an embodiment of this application.

An embodiment in accordance with the disclosure further provides another structure of the apparatus. As shown in FIG. 12, the apparatus 1200 may include a communications interface 1210 and a processor 1220. In some embodiments, the apparatus 1200 may further include a memory 1230. The memory 1230 may be disposed inside the apparatus, or may be disposed outside the apparatus. The receiving unit 1101, the construction unit 1102, the parsing unit 1103, and the calculation unit 1104 that are shown in FIG. 11 may all be implemented by the processor 1220. The processor 1220 sends or receives a video stream or a bitstream through the communications interface 1210, and is configured to implement the methods in FIG. 9 and FIG. 10. In an implementation process, steps in a processing procedure may be implemented by using an integrated logic circuit of hardware in the processor 1220 or an instruction in a form of software, to complete the methods in FIG. 9 and FIG. 10.

The communications interface 1210 in this embodiment of this application may be a circuit, a bus, a transceiver, or any other apparatus that can be configured to exchange information. For example, the another apparatus may be a device connected to the apparatus 1200. For example, when the apparatus is a video encoder, the another apparatus may be a video decoder.

In the embodiments of this application, the processor 1220 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor, any conventional processor, or the like. The steps in the methods disclosed with reference to the embodiments of this application may be directly performed by a hardware processor, or may be performed by using a combination of hardware in the processor and a software unit. Program code executed by the processor 1220 to implement the foregoing methods may be stored in the memory 1230. The memory 1230 is coupled to the processor 1220.

The coupling in this embodiment is an indirect coupling or a communication connection between apparatuses, units, or modules, may be in an electrical form, a mechanical form, or another form, and is used for information exchange between the apparatuses, the units, or the modules.

The processor 1220 may operate with the memory 1230. The memory 1230 may be a nonvolatile memory such as a hard disk drive (HDD) or a solid-state drive (SSD); or may be a volatile memory such as a random-access memory (RAM). The memory 1230 is any other medium that can be configured to carry or store desirable program code that has an instruction or a data structure form and that can be accessed by a computer, but is not limited thereto.

This embodiment of this application does not limit a specific connection medium between the communications interface 1210, the processor 1220, and the memory 1230. In this embodiment of this application, in FIG. 12, the memory 1230, the processor 1220, and the communications interface 1210 are connected through a bus. The bus is represented by a thick line in FIG. 12, and a connection mode between other parts is merely an example for description, and imposes no limitation. The bus may be classified into an address bus, a data bus, a control bus, and the like. For ease of representation, only one thick line is used to represent the bus in FIG. 12, but this does not mean that there is only one bus or only one type of bus.

Based on the foregoing embodiments, an embodiment of this application further provides a computer storage medium. The storage medium stores a software program, and the software program is read and executed by one or more processors, to implement the method provided in any one or more of the foregoing embodiments. The computer readable storage medium may include: any medium that can store program code, such as a USB flash drive, a removable hard disk, a read-only memory, a random-access memory, a magnetic disk, or an optical disc.

Based on the foregoing embodiments, an embodiment of this application further provides a chip. The chip includes a processor configured to implement the functions in any one or more of the foregoing embodiments, for example, obtaining or processing the information or the message in the foregoing methods. In some embodiments, the chip further includes a memory. The memory is configured to store a program instruction and data that are necessary and executed by the processor. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

Various embodiments are described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of another programmable data processing device are used to generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for intra prediction of a picture block, comprising:
   constructing a first luma intra mode set for a current block, wherein
   the first luma intra mode set is a subset of a plurality of preset candidate luma prediction modes; and
   the first luma intra mode set comprises a determined luma prediction mode of a picture block that is not spatially adjacent to the current block in a picture in which the current block is located;

parsing a received bitstream to obtain a first identifier;

when the first identifier indicates that a luma prediction mode of the current block belongs to the first luma intra mode set, parsing the received bitstream to obtain a second identifier, wherein the second identifier indicates that a candidate luma prediction mode in the first luma intra mode set is used as the luma prediction mode of the current block; and obtaining a luma prediction value of the current block based on the luma prediction mode of the current block;

wherein the current block has a width of w and a height of h, the picture in which the current block is located comprises M groups of picture blocks not spatially adjacent to the current block, and each group of picture blocks not spatially adjacent to the current block has a group number, wherein a group of picture blocks with a group number i comprises picture blocks in which pixel set basic units in the following coordinate positions in a virtual coordinate system are located: $(-i \times w, -i \times h)$, $(1+m \times w, -i \times h)$, $(-m \times w, -i \times h)$, $(-i \times w, -m \times h)$, and $(-i \times w, m \times h+1)$, wherein m is an integer in a range from 0 to $i-1$;

M, i, w, and h are positive integers; and i is not greater than M, and a value of i is not 1.

2. The method according to claim 1, wherein the picture in which the current block is located includes at least two rows of coding tree units (CTUs), and a size of the current block is not greater than a size of a CTU in which the current block is located; and a difference between a number of a row, in the picture, of the CTU in which the current block is located and a number of a row, in the picture, of a CTU in which the picture block not spatially adjacent to the current block is located is less than N, wherein N is an integer greater than 1.

3. The method according to claim 1, wherein in the virtual coordinate system, a position, in the picture, of a pixel set basic unit at the bottom-right corner of the current block is used as an origin, a straight line on which the bottom boundary of the current block is located is used as a horizontal coordinate axis with a rightward direction as a positive horizontal direction, and a straight line on which the right boundary of the current block is located is used as a vertical coordinate axis with a downward direction as a positive vertical direction.

4. The method according to claim 1, wherein the first luma intra mode set further comprises a determined luma prediction mode of a picture block in a reference picture that temporally neighbors to the picture in which the current block is located, and wherein the constructing of the first luma intra mode set further comprises:

constructing the first luma intra mode set based on a determined luma prediction mode and a non-directional prediction mode of a picture block neighbouring to the current block, wherein a quantity of candidate luma prediction modes in the first luma intra mode set does not reach a preset value; and sequentially adding, to the first luma intra mode set, a luma prediction mode of a sub-block in the center of a co-located block and a luma prediction mode of a spatial neighboring block at the bottom-right corner of the co-located block, until the quantity of candidate luma prediction modes comprised in the first luma intra mode set reaches the preset value, wherein the sub-block is a basic unit for storing prediction information, wherein the co-located block is a picture block whose size, shape, and position are the same as those of the current block, in a reference picture temporally neighboring to the picture in which the current block is located; and the candidate luma prediction modes comprised in the first luma intra mode set are different from each other.

5. The method according to claim 4, wherein when the luma prediction mode of the sub-block in the center of the co-located block and the luma prediction mode of the spatial neighboring block at the bottom-right corner of the co-located block are sequentially added to the first luma intra mode set, the quantity of candidate luma prediction modes in the first luma intra mode set does not reach the preset value, and the method further comprises:

sequentially adding, in an ascending order of the group numbers, determined luma prediction modes of picture blocks not spatially adjacent to the current block to the first luma intra mode set, until the quantity of candidate luma prediction modes in the first luma intra mode set reaches the preset value, wherein the candidate luma prediction modes in the first luma intra mode set are different from each other.

6. The method according to claim 4, wherein when the luma prediction mode of the sub-block in the center of the co-located block and the luma prediction mode of the spatial neighboring block at the bottom-right corner of the co-located block are sequentially added to the first luma intra mode set, the quantity of candidate luma prediction modes comprised in the first luma intra mode set does not reach the preset value, and the method further comprises:

sequentially adding, in an ascending order of distances to an origin from picture blocks not spatially adjacent to the current block, determined luma prediction modes of the picture blocks not spatially adjacent to the current block to the first luma intra mode set, wherein the distance is a sum of absolute values of a horizontal coordinate and a vertical coordinate, in a virtual coordinate system, of a pixel set basic unit in a preset position in the picture block not spatially adjacent to the current block.

7. The method according to claim 5, wherein sequentially adding the determined luma prediction modes of the picture blocks not spatially adjacent to the current block to the first luma intra mode set comprises:

sequentially adding, to the first luma intra mode set in an order of picture blocks in which pixel set basic units in the following coordinate positions in the virtual coordinate system are located, the determined luma prediction modes of the picture blocks not spatially adjacent to the current block, until the quantity of candidate luma prediction modes in the first luma intra mode set reaches the preset value: $(-2 \times w, 0)$, $(0, -2 \times h)$, $(1, -2 \times h)$, $(-2 \times w, 1)$, $(-w, -2 \times h)$, $(-2 \times w, -h)$, $(-2 \times w, h+1)$, $(w+1, -2 \times h)$, $(-2 \times w, -2 \times h)$, $(-3 \times w, 0)$, $(0, -3 \times h)$, $(1, -3 \times h)$, $(-3 \times w, 1)$, $(-w, -3 \times h)$, $(-3 \times w, -h)$, $(w+1, -3 \times h)$, $(-3 \times w, h+1)$, $(-2 \times w, -3 \times h)$, $(-3 \times w, -2 \times h)$, $(2 \times w+1, -3 \times h)$, $(-3 \times w, 2 \times h+1)$, and $(-3 \times w, -3 \times h)$.

8. A method for intra prediction of a picture block, comprising:

parsing a received bitstream to obtain a first identifier;

when the first identifier indicates that a chroma prediction mode of a current block is not a cross-component linear model (CCLM) mode, constructing a chroma intra mode set for the current block, wherein the chroma intra mode set comprises a determined chroma prediction mode of a picture block that is not spatially adjacent to the current block in a picture in which the current block is located;

parsing the received bitstream to obtain a second identifier, wherein the second identifier indicates that a candidate chroma prediction mode in the chroma intra mode set is used as the chroma prediction mode of the current block; and obtaining a chroma prediction value of the current block based on the chroma prediction mode of the current block;

wherein the current block has a width of w and a height of h, the picture in which the current block is located comprises M groups of picture blocks not spatially adjacent to the current block, and each group of picture blocks not spatially adjacent to the current block has a group number, wherein a group of picture blocks with a group number i comprises picture blocks in which pixel set basic units in the following coordinate positions in a virtual coordinate system are located: $(-i \times w, -i \times h)$, $(1+m \times w, -i \times h)$, $(-m \times w, -i \times h)$, $(-i \times w, -m \times h)$, and $(-i \times w, m \times h+1)$, wherein m is an integer in a range from 0 to i−1;
M, i, w, and h are positive integers; and
i is not greater than M, and a value of i is not 1.

9. The method according to claim 8, wherein
the picture in which the current block is located includes at least two rows of coding tree units (CTUs), and a size of the current block is not greater than a size of a CTU in which the current block is located; and
a difference between a number of a row, in the picture, of the CTU in which the current block is located and a number of a row, in the picture, of a CTU in which the picture block not spatially adjacent to the current block is located is less than N, wherein N is an integer greater than 1.

10. The method according to claim 8, wherein
in the virtual coordinate system, a position, in the picture, of a pixel set basic unit at the bottom-right corner of the current block is used as an origin, a straight line on which the bottom boundary of the current block is located is used as a horizontal coordinate axis with a rightward direction as a positive horizontal direction, and a straight line on which the right boundary of the current block is located is used as a vertical coordinate axis with a downward direction as a positive vertical direction.

11. The method according to claim 8, wherein the first luma intra mode set further comprises a determined luma prediction mode of a picture block in a reference picture that temporally neighbors to the picture in which the current block is located, the constructing the chroma intra mode set further comprises:

constructing the chroma intra mode set based on a luma prediction mode and a determined chroma prediction mode of a picture block spatially neighboring the current block, wherein a quantity of candidate chroma prediction modes comprised in the chroma intra mode set does not reach a preset value; and sequentially adding, to the chroma intra mode set, a chroma prediction mode of a sub-block in the center of a co-located block and a chroma prediction mode of a spatial neighboring block at the bottom-right corner of the co-located block, until the quantity of candidate chroma prediction modes comprised in the chroma intra mode set reaches the preset value, wherein the sub-block is a basic unit for storing prediction information;

the co-located block is a picture block whose size, shape, and position are the same as those of the current block, in a reference picture temporally neighboring to the picture in which the current block is located; and the candidate chroma prediction modes comprised in the chroma intra mode set are different from each other.

12. The method according to claim 11, wherein when the chroma prediction mode of the sub-block in the center of the co-located block and the chroma prediction mode of the spatial neighboring block at the bottom-right corner of the co-located block are sequentially added to the chroma intra mode set, the quantity of candidate chroma prediction modes comprised in the chroma intra mode set does not reach the preset value, the method further comprises:

sequentially adding, in an ascending order of the group numbers, chroma prediction modes of picture blocks not spatially adjacent to the current block to the chroma intra mode set, until the quantity of candidate chroma prediction modes in the chroma intra mode set reaches the preset value, wherein the candidate chroma prediction modes in the chroma intra mode set are different from each other.

13. The method according to claim 11, wherein when the chroma prediction mode of the sub-block in the center of the co-located block and the chroma prediction mode of the spatial neighboring block at the bottom-right corner of the co-located block are sequentially added to the chroma intra mode set, the quantity of candidate chroma prediction modes comprised in the chroma intra mode set does not reach the preset value, the method further comprises:

sequentially adding, in an ascending order of distances to an origin from picture blocks not spatially adjacent to the current block, chroma prediction modes of the picture blocks not spatially adjacent to the current block to the chroma intra mode set, wherein the distance is a sum of absolute values of a horizontal coordinate and a vertical coordinate, in a virtual coordinate system, of a pixel set basic unit in a preset position in the picture block not spatially adjacent to the current block.

14. The method according to claim 12, wherein sequentially adding the chroma prediction modes of the picture blocks not spatially adjacent to the current block to the chroma intra mode set comprises:

sequentially adding, to the chroma intra mode set in an order of picture blocks in which pixel set basic units in the following coordinate positions in the virtual coordinate system are located, the determined chroma prediction modes of the picture blocks not spatially adjacent to the current block, until the quantity of candidate chroma prediction modes in the chroma intra mode set reaches the preset value: $(-2 \times w, 0)$, $(0, -2 \times h)$, $(1, -2 \times h)$, $(-2 \times w, 1)$, $(-w, -2 \times h)$, $(-2 \times w, -h)$, $(-2 \times w, h+1)$, $(w+1, -2 \times h)$, $(-2 \times w, -2 \times h)$, $(-3 \times w, 0)$, $(0, -3 \times h)$, $(1, -3 \times h)$, $(-3 \times w, 1)$, $(-w, -3 \times h)$, $(-3 \times w, -h)$, $(w+1, -3 \times h)$, $(-3 \times w, h+1)$, $(-2 \times w, -3 \times h)$, $(-3 \times w, -2 \times h)$, $(2 \times w+1, -3 \times h)$, $(-3 \times w, 2 \times h+1)$, and $(-3 \times w, -3 \times h)$.

15. An apparatus, comprising:
a memory and a processor, wherein
the memory is configured to store a program instruction; and the processor is configured to invoke and execute the program instruction stored in the memory, to perform:

constructing a first luma intra mode set for a current block, wherein
- the first luma intra mode set is a subset of a plurality of preset candidate luma prediction modes; and
- the first luma intra mode set comprises a determined luma prediction mode of a picture block that is not spatially adjacent to the current block in a picture in which the current block is located;

parsing a received bitstream to obtain a first identifier;

when the first identifier indicates that a luma prediction mode of the current block belongs to the first luma intra mode set, parsing the received bitstream to obtain a second identifier, wherein the second identifier indicates that a candidate luma prediction mode in the first luma intra mode set is used as the luma prediction mode of the current block; and obtaining a luma prediction value of the current block based on the luma prediction mode of the current block;

wherein the current block has a width of w and a height of h, the picture in which the current block is located comprises M groups of picture blocks not spatially adjacent to the current block, and each group of picture blocks not spatially adjacent to the current block has a group number, wherein a group of picture blocks with a group number i comprises picture blocks in which pixel set basic units in the following coordinate positions in a virtual coordinate system are located: $(-i \times w, -i \times h)$, $(1+m \times w, -i \times h)$, $(-m \times w, -i \times h)$, $(-i \times w, -m \times h)$, and $(-i \times w, m \times h+1)$, wherein m is an integer in a range from 0 to i−1;

M, i, w, and h are positive integers; and i is not greater than M, and a value of i is not 1.

16. The apparatus of claim 15, wherein the picture in which the current block is located includes at least two rows of coding tree units (CTUs), and a size of the current block is not greater than a size of a CTU in which the current block is located; and a difference between a number of a row, in the picture, of the coding tree unit in which the current block is located and a number of a row, in the picture, of a coding tree unit in which the picture block not spatially adjacent to the current block is located is less than N, wherein N is an integer greater than 1.

17. The apparatus of claim 15, wherein in the virtual coordinate system, a position, in the picture, of a pixel set basic unit at the bottom-right corner of the current block is used as an origin, a straight line on which the bottom boundary of the current block is located is used as a horizontal coordinate axis with a rightward direction as a positive horizontal direction, and a straight line on which the right boundary of the current block is located is used as a vertical coordinate axis with a downward direction as a positive vertical direction.

18. The apparatus of claim 15, wherein the first luma intra mode set further comprises a determined luma prediction mode of a picture block in a reference picture that temporally neighbors to the picture in which the current block is located, the processor is further configured to perform:

constructing the first luma intra mode set based on a determined luma prediction mode and a non-directional prediction mode of a picture block neighbouring to the current block, wherein a quantity of candidate luma prediction modes comprised in the first luma intra mode set does not reach a preset value; and sequentially adding, to the first luma intra mode set, a luma prediction mode of a sub-block in the center of a co-located block and a luma prediction mode of a spatial neighboring block at the bottom-right corner of the co-located block, until the quantity of candidate luma prediction modes comprised in the first luma intra mode set reaches the preset value, wherein the sub-block is a basic unit for storing prediction information; the co-located block is a picture block whose size, shape, and position are the same as those of the current block, in a reference picture temporally neighboring to the picture in which the current block is located; and the candidate luma prediction modes comprised in the first luma intra mode set are different from each other.

19. The apparatus according to claim 18, wherein when the luma prediction mode of the sub-block in the center of the co-located block and the luma prediction mode of the spatial neighboring block at the bottom-right corner of the co-located block are sequentially added to the first luma intra mode set, the quantity of candidate luma prediction modes comprised in the first luma intra mode set does not reach the preset value, the processor is further configured to perform:

sequentially adding, in an ascending order of the group numbers, determined luma prediction modes of picture blocks not spatially adjacent to the current block to the first luma intra mode set, until the quantity of candidate luma prediction modes in the first luma intra mode set reaches the preset value, wherein the candidate luma prediction modes in the first luma intra mode set are different from each other.

20. The apparatus according to claim 18, wherein when the luma prediction mode of the sub-block in the center of the co-located block and the luma prediction mode of the spatial neighboring block at the bottom-right corner of the co-located block are sequentially added to the first luma intra mode set, the quantity of candidate luma prediction modes comprised in the first luma intra mode set does not reach the preset value, the processor is further configured to perform:

sequentially adding, in an ascending order of distances to an origin from picture blocks not spatially adjacent to the current block, determined luma prediction modes of the picture blocks not spatially adjacent to the current block to the first luma intra mode set, wherein the distance is a sum of absolute values of a horizontal coordinate and a vertical coordinate, in a virtual coordinate system, of a pixel set basic unit in a preset position in the picture block not spatially adjacent to the current block.

\* \* \* \* \*

UNITED STATES PATENT AND TRADEMARK OFFICE
CERTIFICATE OF CORRECTION

| | |
|---|---|
| PATENT NO. | : 11,457,222 B2 |
| APPLICATION NO. | : 17/035711 |
| DATED | : September 27, 2022 |
| INVENTOR(S) | : Na Zhang et al. |

It is certified that error appears in the above-identified patent and that said Letters Patent is hereby corrected as shown below:

On the Title Page

Item [57], Line 1, after "apparatus" delete "and".

Signed and Sealed this
Eighth Day of November, 2022

*Katherine Kelly Vidal*

Katherine Kelly Vidal
*Director of the United States Patent and Trademark Office*